(12) United States Patent
Ogasawara et al.

(10) Patent No.: US 10,477,175 B2
(45) Date of Patent: Nov. 12, 2019

(54) IMAGE PICKUP APPARATUS, INFORMATION PROCESSING SYSTEM, MAT, AND IMAGE GENERATION METHOD

(71) Applicant: Sony Interactive Entertainment Inc., Tokyo (JP)

(72) Inventors: Hidehiko Ogasawara, Tokyo (JP); Norio Nagatsuka, Tokyo (JP); Naoki Numaguchi, Tokyo (JP); Hiroyuki Segawa, Kanagawa (JP); Akio Ohba, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/547,707

(22) PCT Filed: Jan. 29, 2016

(86) PCT No.: PCT/JP2016/052777
§ 371 (c)(1),
(2) Date: Jul. 31, 2017

(87) PCT Pub. No.: WO2016/125714
PCT Pub. Date: Aug. 11, 2016

(65) Prior Publication Data
US 2018/0027222 A1 Jan. 25, 2018

(30) Foreign Application Priority Data
Feb. 6, 2015 (JP) ................................. 2015-022243

(51) Int. Cl.
*H04N 9/77* (2006.01)
*H04N 5/235* (2006.01)
(Continued)

(52) U.S. Cl.
CPC ............... *H04N 9/77* (2013.01); *A63F 13/25* (2014.09); *A63F 13/32* (2014.09); *A63F 13/42* (2014.09);
(Continued)

(58) Field of Classification Search
CPC ........ H04N 9/77; H04N 5/2351; H04N 9/735; H04N 17/002; H04N 17/02; H04N 9/69;
(Continued)

(56) References Cited

U.S. PATENT DOCUMENTS 5,546,475 A * 8/1996 Bolle .................. G06K 9/4647
382/110
7,251,362 B2 7/2007 Osawa
(Continued)

FOREIGN PATENT DOCUMENTS

JP 11096333 A 4/1999
JP 2008073256 A 4/2008
(Continued)

OTHER PUBLICATIONS

International Preliminary Report on Patentability and Written Opinion for corresponding PCT Application No. PCT/JP2016/052777, 11 pages, dated Aug. 17, 2017.
(Continued)

*Primary Examiner* — Luong T Nguyen
(74) *Attorney, Agent, or Firm* — Matthew B. Dernier, Esq.

(57) ABSTRACT

An image of a block or the like entering a space above a play mat is picked up by an image pickup apparatus, and an information processing apparatus detects and recognizes the block on the basis of a picture of the block in a picked up image and performs information processing. The play mat includes a play field that defines a detection space for the block, and a calibration chart including at least a plurality of
(Continued)

regions of colors of different luminances. The image pickup apparatus adjusts an exposure time period, a gain value for each color component and a correction rule upon gamma correction on the basis of the picture of the calibration chart in the picked up image.

16 Claims, 16 Drawing Sheets

(51) Int. Cl.
| | | |
|---|---|---|
| A63F 13/25 | (2014.01) | |
| A63F 13/32 | (2014.01) | |
| A63F 13/42 | (2014.01) | |
| A63F 13/65 | (2014.01) | |
| H04N 9/07 | (2006.01) | |
| H04N 9/69 | (2006.01) | |
| H04N 9/73 | (2006.01) | |
| H04N 17/00 | (2006.01) | |
| H04N 17/02 | (2006.01) | |
| A63F 13/213 | (2014.01) | |
| G03B 15/00 | (2006.01) | |
| H04N 5/225 | (2006.01) | |
| H04N 9/04 | (2006.01) | |
| G06K 9/00 | (2006.01) | |
| G06K 9/60 | (2006.01) | |
| H04N 1/407 | (2006.01) | |
| A63H 33/04 | (2006.01) | |

(52) U.S. Cl.
CPC .............. *A63F 13/65* (2014.09); *G03B 15/00* (2013.01); *G06K 9/00201* (2013.01); *G06K 9/60* (2013.01); *H04N 1/4076* (2013.01); *H04N 1/4078* (2013.01); *H04N 5/225* (2013.01); *H04N 5/235* (2013.01); *H04N 5/2351* (2013.01); *H04N 5/2352* (2013.01); *H04N 9/04* (2013.01); *H04N 9/07* (2013.01); *H04N 9/69* (2013.01); *H04N 9/735* (2013.01); *H04N 17/002* (2013.01); *H04N 17/02* (2013.01); *A63F 13/213* (2014.09); *A63H 33/04* (2013.01)

(58) Field of Classification Search
CPC ........ H04N 5/2352; H04N 9/07; H04N 5/235; H04N 5/225; H04N 9/04; H04N 1/4078; H04N 1/4076; G03B 15/00; G06K 9/46; G06K 9/00201; G06K 9/60; A63H 33/04; A63F 13/213; A63F 13/25; A63F 13/65; A63F 13/42; A63F 13/32
See application file for complete search history.

(56) References Cited

U.S. PATENT DOCUMENTS

| | | | | |
|---|---|---|---|---|
| 7,796,833 | B2 * | 9/2010 | Polonskiy | ................ G01J 3/28 382/103 |
| 8,532,371 | B2 * | 9/2013 | Agarwal | .............. H04N 1/6088 382/162 |
| 2003/0185438 | A1 | 10/2003 | Osawa | |
| 2013/0321447 | A1 * | 12/2013 | Horovitz | ................ A63F 13/06 345/589 |

FOREIGN PATENT DOCUMENTS

| | | |
|---|---|---|
| JP | 2010028780 A | 2/2010 |
| WO | 2009007978 A2 | 1/2009 |
| WO | 2011017393 A1 | 2/2011 |
| WO | 2011089094 A1 | 7/2011 |

OTHER PUBLICATIONS

International Search Report for corresponding PCT Application No. PCT/JP2016/052777, 2 pages, dated Apr. 5, 2016.
Michael Philetus Weller, et al., "Posey" Instrucmenting a Poseable Hub and Strut Construction Toy Proceedings of the Second International Conference on Tangible and Embedded Interaction (TEI'08), Bonn, Germany, 8 pages, (Feb. 18-20, 2008).
Extended Search Report for corresponding EP Application No. 16746545.9, 12 pages, dated Aug. 13, 2013.

* cited by examiner

IMAGE PICKUP APPARATUS, INFORMATION PROCESSING SYSTEM, MAT, AND IMAGE GENERATION METHOD

TECHNICAL FIELD

The present invention relates an information processing system that performs an information process including recognition of a real object in which a pickup image is used, an image pickup apparatus and a mat included in the system and an image production method used in the information processing system.

BACKGROUND ART

Conventionally, a toy wherein a three-dimensional object can be assembled by connecting a plurality of blocks or parts to each other is known. For example, blocks that can be freely assembled in response to an idea of a user and individually have a basic shape such as a cube or a rectangular solid, blocks or parts for exclusive use formed so as to assemble a three-dimensional object supposed in advance in accordance with a design drawing and so forth are widely spread. Further, a technology wherein a computer recognizes a movement or a shape variation of an object in a real space and performs some information processing is expected to be applied to a toy, a teaching material for learning and so forth (for example, refer to PTL 1 and NPL 1).

CITATION LIST

Patent Literature

[PTL 1] Japanese Patent Laid-Open No. 2008-73256

Non Patent Literature

[NPL 1] Posey: Instrumenting a Poseable Hub and Strut Construction Toy, Michael Philetus Weller, Ellen Yi-Luen Do, Mark D Gross, Proceedings of the Second International Conference on Tangible and Embedded Interaction, 2008, pp 39-46

SUMMARY

Technical Problem

When an object whose image is picked up by a camera is to be recognized in such a technology as described above, a color of the object is important information. However, the color of a picture of the object in the picked up image varies depending upon an image pickup environment such as an illumination, a material of the object and so forth and correct recognition is sometimes obstructed. For example, even if the same object is used, this is recognized as a different object in some cases, or such a case occurs in which a subtle difference of color sometimes can be distinguished or sometimes cannot be distinguished. In this manner, the recognition accuracy becomes instable, and it is supposed that a trouble may occur in processing at a later stage.

The present invention has been made in view of such a subject as described above, and it is an object of the present invention to provide a technology by which information processing including recognition of a real object in which a picked up image is used can be implemented in stability and with high accuracy.

Solution to Problem

In order to solve the subject described above, an aspect of the present invention relates to an image pickup apparatus. This image pickup apparatus is an image pickup apparatus that outputs data of a picked up image to be used for recognition of a real object, including an output image production unit configured to produce data of a picked up image to be outputted from data of a non-processed image picked up using an image pickup element, an adjustment processing unit configured to evaluate the picked up image and adjust at least one of an image pickup condition in the image pickup element and a processing condition in the output image production unit, and a data sending out unit configured to output the data of the picked up image to an apparatus that recognizes the real object, wherein the adjustment processing unit adjusts the image pickup condition and the processing condition based on color information of a picture of a calibration chart that is provided in a space of a recognition target and is configured from a plurality of color regions having luminances different from each other.

Another aspect of the present invention relates to an information processing system. This information processing system is an information processing system including an image pickup apparatus that outputs data of a picked up image obtained by image pickup of a real object and an information processing apparatus that recognizes the real object using the picked up image, wherein the image pickup apparatus includes an output image production unit configured to produce data of a picked up image to be outputted from data of a non-processed image picked up using an image pickup element, an adjustment processing unit configured to evaluate the picked up image and adjust at least one of an image pickup condition in the image pickup element and a processing condition in the output image production unit, and a data sending out unit configured to output the data of the picked up image to the information processing apparatus, and the adjustment processing unit adjusts the image pickup condition and the processing condition based on color information of a picture of a calibration chart that is provided in a space of a recognition target and is configured from a plurality of color regions having luminances different from each other, and the information processing apparatus recognizes a block by comparison between color information of the picture of the real object in the picked up image and color information of real objects registered already with each other and performs a process set for the block.

A further aspect of the present invention relates to a mat. This mat is a mat that is placed in an image pickup space in an information processing system that recognizes a real object based on color information of a picture in a picked up image, including a play field that defines a bottom region of a space in which, when the real object is placed into the space, the real object is determined as a recognition target, and a calibration chart configured from a plurality of color regions having different luminances from each other and used by an image pickup apparatus to adjust, based on color information of a picture in the picked up image, at least one of an image pickup condition and a processing condition when data of the picked up image to be outputted is produced.

A still further aspect of the present invention relates an image production method. This image production method is an image production method, by an image pickup apparatus, of producing data of a picked up image to be used for recognition of a real object, including a step of producing data of a picked up image to be outputted from data of a non-processed image picked up using an image pickup element, a step of evaluating the picked up image and adjusting at least one of an image pickup condition in the image pickup element and a processing condition in the producing step, and a step of outputting the data of the picked up image to an apparatus that recognizes the real object, wherein the step of adjusting adjusts the image pickup condition and the processing condition based on color information of a picture of a calibration chart that is provided in a space of a recognition target and is configured from a plurality of color regions having luminances different from each other.

It is to be noted that arbitrary combinations of the components described above and conversions of the representation of the present invention between a method, an apparatus, a system, a recording medium, a computer program and so forth are effective as modes of the present invention.

Advantageous Effect of Invention

According to the present invention, information processing including recognition of a real object in which a picked up image is used can be performed stably and with high accuracy.

DESCRIPTION OF EMBODIMENT

Figure 1:
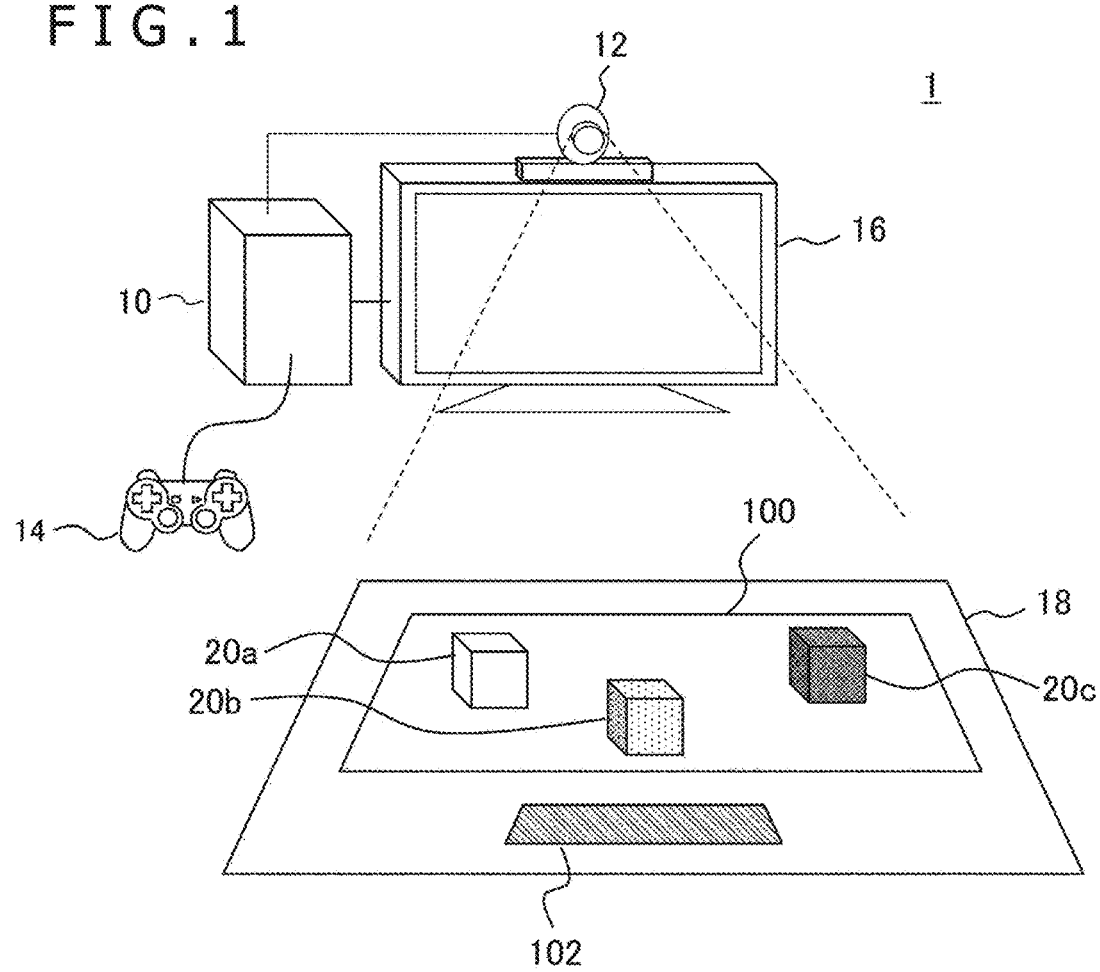
FIG. 1 is a view depicting an example of a configuration of an information processing system to which an embodiment can be applied.

FIG. 1 depicts an example of a configuration of an information processing system to which an embodiment can be applied. An information processing system 1 includes blocks 20a, 20b and 20c placed on a play mat 18, an image pickup apparatus 12 for picking up an image of the space above the play mat 18, an information processing apparatus 10 for recognizing the blocks on the basis of a picked up image and performing information processing in response to a result of the recognition, an inputting apparatus 14 for accepting a user operation to the information processing apparatus 10, and a display apparatus 16 for outputting a result of the information processing as an image.

The play mat 18 includes a play field 100 that is a region in which the blocks 20a, 20b and 20c of a recognition target are to be placed, and a calibration chart 102 for determining an image pickup condition or an adjustment or correction condition for the image pickup apparatus 12. The material of the play mat 18 is any of paper, a plate, a cloth, vinyl and so forth and is not limited especially. Also the shape of the play mat 18 is not limited especially and may be such a quadrangular shape as depicted in FIG. 1 or may be any other polygon or a shape surrounded by a curve like a circle or an ellipsis. The play mat 18 may have some other application as a top plate of a desk, a game board or the like.

Although the play field 100 or the calibration chart 102 typically is a region or a graphic printed on the play mat 18, it may otherwise be configured such that an article prepared separately is attached to or placed on a plane that configures the play mat 18. Although each of the blocks 20a, 20b and 20c most simply is such a general "block" of a cube or a rectangular parallelepiped, it is not limited in shape or function only if it is an object existing in the real space.

For example, each block may be an article of a more complicated shape such as a miniature of an article existing in the real world such as a doll or a minicar or a part of such a miniature as just mentioned or a piece of a game, and also the size, material, color, quantity to be used and so forth of such blocks are not limited. Further, each block may be structured such that it can be assembled and disassembled by a user or may be a finished product. Further, each block may have a communication mechanism or a computer for establishing communication with the inputting apparatus 14 or the information processing apparatus 10, a mechanism for driving the inputting apparatus 14 in response to a user operation or under the control of the information processing apparatus 10 and so forth or may not have any of such mechanisms.

The image pickup apparatus 12 is a video camera having an image pickup element of a charge coupled device (CCD) type, a complementary metal oxide semiconductor (CMOS) type or the like and picks up an image of the space above the play mat 18 and supplies the image to the information processing apparatus 10. The image pickup apparatus 12 may be a monocular camera as depicted in FIG. 1 or may be a stereo camera configured from two cameras for picking up an image of the same space from left and right positions having a known distance therebetween.

The display apparatus 16 may be a general display unit such as a liquid crystal display unit, a plasma display unit or an organic electroluminescence (EL) display unit. Alternatively, a television set in which the display apparatus 16 and a speaker not depicted are provided integrally may be used. The inputting apparatus 14 accepts, when it is operated by a user, a request for starting of processing, ending, selection of a function or inputting of various commands and supplies an accepted request as an electric signal to the information processing apparatus 10. The inputting apparatus 14 may be any of general inputting apparatus such as a game controller, a keyboard, a mouse, a joystick, a touch pad that is provided on the screen of the display apparatus 16 and so forth or may be any combination of them.

The information processing apparatus 10 may be, for example, a game apparatus or a personal computer, and an information processing function may be implemented by loading a necessary application program into the information processing apparatus 10. The information processing apparatus 10 detects or chases the block 20a, 20b or 20c on the play field 100. To this end, the information processing apparatus 10 acquires a moving image picked up by the image pickup apparatus 12 at a predetermined frame rate and extracts and recognizes a picture of the block from the image. Thereafter, if the user moves the block by a hand or by the inputting apparatus 14 or the information processing apparatus 10 itself controls the movement of the block, then the information processing apparatus 10 chases the variation of the position. If the shape of the block is variable, then also the shape variation is chased.

Although the information processing apparatus 10 may perform some information processing utilizing a detection result or a chase result of a block, the contents of the information processing are not limited especially. For example, a moving image that is being picked up by the image pickup apparatus 12 and in which an additional object to a picture of a block is rendered or a block is replaced by a corresponding object may be displayed on the display apparatus 16. Alternatively, a game may be progressed in response to the position of a block, and a game screen image representative of the contents of the game may be displayed on the display apparatus 16 or effect sound or voice may be outputted from a speaker not depicted.

Further, it can be recognized by those skilled in the art that various processes may be performed using a detection result or a chase result of a block. In the following, a technique for performing detection of a block with a high degree of accuracy is described especially focusing on a technique for improving the recognition accuracy of a block by acquiring color information of the block with a high degree of accuracy.

It is to be noted that connection between the information processing apparatus 10 and the image pickup apparatus 12, inputting apparatus 14 and display apparatus 16 may be established by various networks irrespective of whether they are wire networks or wireless networks. Alternatively two or all of them may be combined and provided integrally. Depending upon a process to be performed at a succeeding step by the information processing apparatus 10, a speaker or a microphone may be connected further, or the inputting apparatus 14 or the display apparatus 16 may not be provided. In this manner, an inputting apparatus other than the image pickup apparatus 12 and an outputting apparatus can be combined suitably in the information processing system 1.

Figure 2:
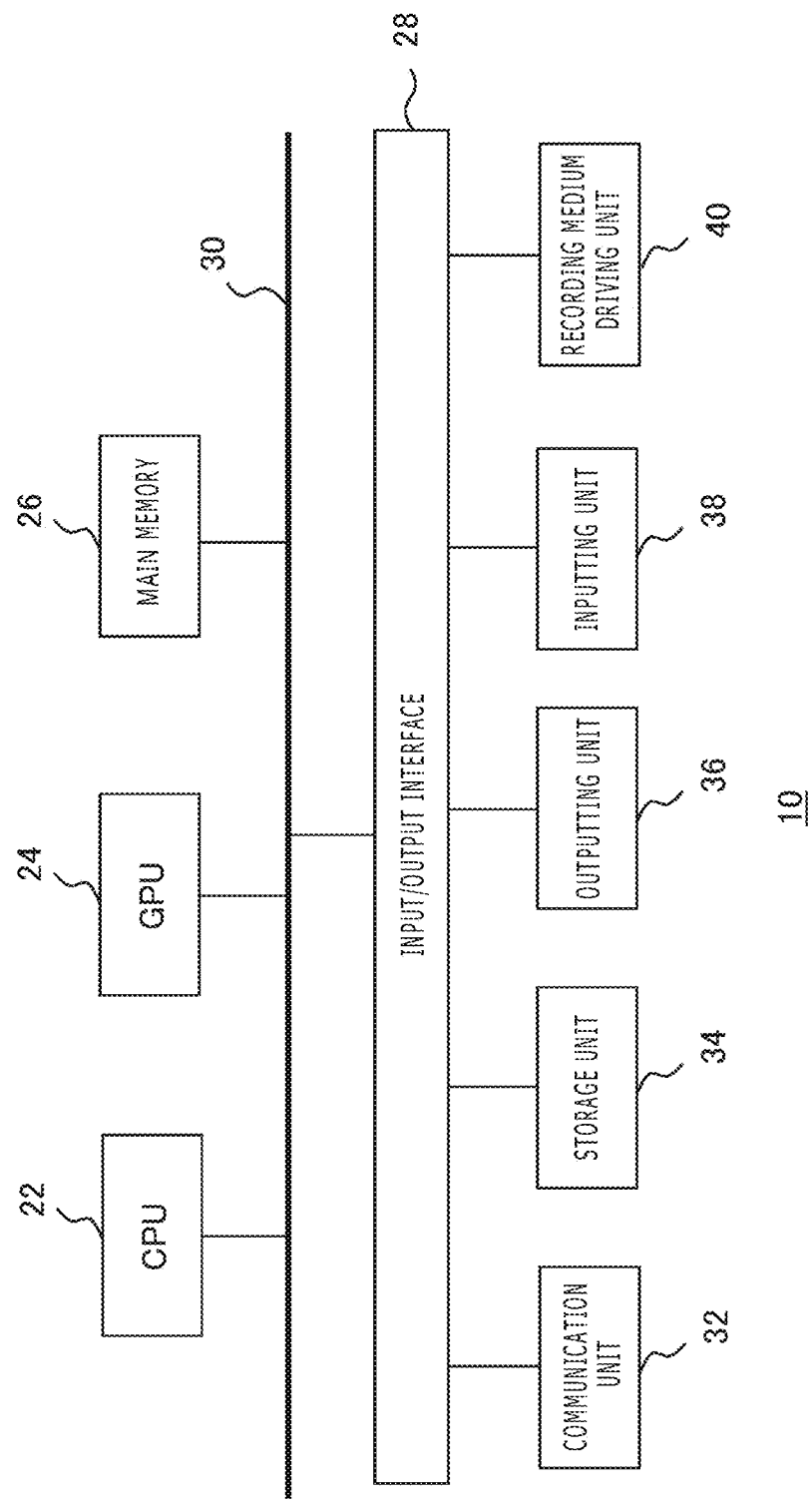
FIG. 2 is a view depicting a configuration of an internal circuit of an information processing apparatus in the present embodiment.

FIG. 2 depicts a configuration of an internal circuit of the information processing apparatus 10. The information processing apparatus 10 includes a central processing unit (CPU) 22, a graphics processing unit (GPU) 24 and a main memory 26. The CPU 22 controls processing or signal transmission in or between internal components of the information processing apparatus 10 on the basis of a program such as an operating system or an application. The GPU 24 performs image processing. The main memory 26 is configured from a random access memory (RAM) and stores programs or data necessary for processing.

The components mentioned are connected to each other by a bus 30. Further, an input/output interface 28 is connected to the bus 30. To the input/output interface 28, a communication unit 32 configured from a peripheral apparatus interface of universal serial bus (USB), Institute of Electrical and Electronics Engineers (IEEE)1394 or the like or a network interface for a wire or wireless local area network (LAN), a storage unit 34 such as a hard disk drive or a nonvolatile memory, an outputting unit 36 for outputting data to an outputting apparatus such as the display apparatus 16 or a speaker, an inputting unit 38 for inputting data from the image pickup apparatus 12 or the inputting apparatus 14, and a recording medium driving unit 40 for driving a removable recording medium such as a magnetic disk, an optical disc or a semiconductor memory.

The CPU 22 executes the operating system stored in the storage unit 34 to control the entire information processing apparatus 10. The CPU 22 further executes various programs read out from a removable recording medium and loaded into the main memory 26 or downloaded through the communication unit 32. The GPU 24 has a function of a geometry engine and a function of a rendering processor, and performs a rendering process in accordance with a rendering instruction from the CPU 22 and stores a resulting display image into a frame buffer not depicted. Then, the GPU 24 converts the display image stored in the frame buffer into a video signal and outputs the video signal to the outputting unit 36.

Figure 3:
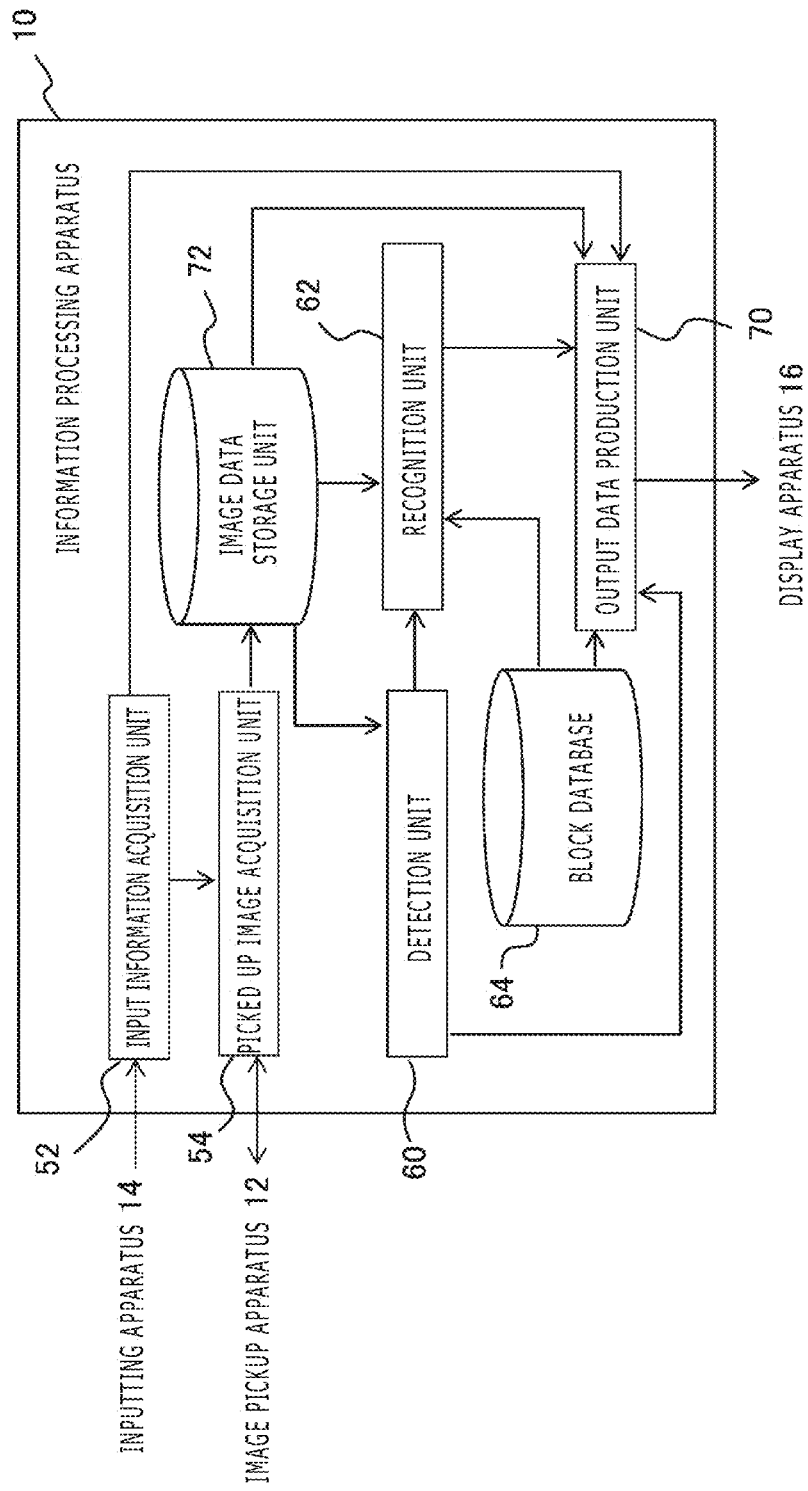
FIG. 3 is a view depicting a configuration of functional blocks of the information processing apparatus in the present embodiment.

FIG. 3 depicts a configuration of functional blocks of the information processing apparatus 10. The functional blocks depicted in FIG. 3 and FIG. 4 hereinafter described can be configured, in hardware, from such a CPU, a GPU, a main memory, an outputting unit, an inputting unit, a microcomputer, various arithmetic operation units, a buffer memory and so forth as depicted in FIG. 2, and is implemented, in software, from a computer program or the like loaded from a hard disk or a recording medium into the main memory. Accordingly, it is recognized by those skilled in the art that the functional blocks described above can be implemented in various forms from only hardware, from only software or from a combination of hardware and software and are not limited to any of them.

The information processing apparatus 10 includes an input information acquisition unit 52 that acquires information relating to a user operation accepted by the inputting apparatus 14, a picked up image acquisition unit 54 that acquires data of a picked up image from the image pickup apparatus 12, a detection unit 60 that performs detection of a block, a recognition unit 62 that recognizes a detected block, an output data production unit 70 that produces output data in response to a position or a movement of the block, an image data storage unit 72 that stores image data to be used in processing such as the picked up image or a depth image, and a block database 64 that stores basic information of the block.

It is to be noted that the information processing apparatus 10 may further include a function block according to contents of information processing performed utilizing a state of a block suitably such as a function block that controls a driving mechanism in the inside of the block. The input information acquisition unit 52 notifies the picked up image acquisition unit 54 and the output data production unit 70 of contents of an operation performed by the user through the inputting apparatus 14. This operation includes starting and ending requests of information processing of a game or the like, command inputting during a process and so forth. The starting/ending request of a process is notified of also to the image pickup apparatus 12 through the picked up image acquisition unit 54 to control starting/ending of moving image pickup by the image pickup apparatus 12.

The picked up image acquisition unit 54 acquires frame data of a moving image obtained as a result of image pickup at a predetermined frame rate. The predetermined rate here may be a frame rate of a moving image to be picked up by the image pickup apparatus 12 or may be a rate lower than the frame rate. The picked up image acquisition unit 54 stores acquired data of a picked up image into the image data storage unit 72.

The detection unit 60 reads out data of a picked up image from the image data storage unit 72 and detects or chase a block on the play field 100 on the basis of a picture on the image. For example, the detection unit 60 recognizes that a block is placed on the basis of the difference between a picked up image in a state in which a block is not placed and frame images in a moving image being picked up. If it is assumed that the color of the play field 100 is known, then also it is possible to detect a picture having a different color from the known color as a block. After a block is detected once, a movement of the block can be chased by comparison with a preceding frame image. Various technologies have been proposed for chasing a movement of an object in an image, and any of the technologies may be adopted in the present embodiment.

Alternatively, the image pickup apparatus 12 may be configured from a stereo camera such that a block is detected from depth information from the cameras in an image pickup space. In particular, from depth information of image pickup objects obtained by the stereo camera, the position or the height of the image pickup objects in a three-dimensional space having a bottom face given by the play field 100 by coordinate transformation. Then, if an object whose height from the plane of the play field 100 exceeds a predetermined threshold value exists, then this is detected as a block. A technique for acquiring depth information of an image pickup object using a stereo camera is widely known. It is to be noted that, in the present mode, especially the play field 100 defines the bottom of the three-dimensional space of a detection target and can determine a block entering the space above the bottom of the three-dimensional space as a detection target irrespective of whether or not the block is placed on the play field 100.

If a block is detected, then the detection unit 60 notifies the recognition unit 62 of this together with position information of the picture of the block on the image. Further, the detection unit 60 successively supplies results of the chase of the detected block, namely, position information in each frame, to the output data production unit 70 until the block goes out of the play field 100. The recognition unit 62 acquires characteristics of an appearance of the block existing at the position notified of from the detection unit 60 using the picked up image read out from the image data storage unit 72.

Then, the recognition unit 62 compares the appearance characteristic of the block with characteristics of blocks stored in advance in the block database 64 to specify to which block the picture detected in the image belongs. In the block database 64, information that associates identification numbers of blocks, characteristics in appearance such as a color or a shape, data to be outputted in response to the position or the movement of a block and so forth with each other is stored in advance. The recognition unit 62 notifies the output data production unit 70 of an identification number of the block obtained in such a manner as described above and the position information of the block in the image in an associated relationship with each other.

The output data production unit 70 produces data of an image to be outputted in response to the position and the movement of the block and outputs the data to the display apparatus 16. Therefore, the output data production unit 70 continues to acquire position information of the block from the detection unit 60 and refers to the block database 64 on the basis of the identification number of the block notified of from the recognition unit 62 to determine a process to be performed. For example, the output data production unit 70 renders an object associated with the block at the position of the block on the picked up image or performs processing for the picked up image in response to a positional relationship of the block to a different block.

In such a case as described above, the output data production unit 70 reads out the picked up image from the image data storage unit 72 and carries out a corresponding process. However, particular contents of the information processing are not limited as described above, and the information processing may not necessarily use the picked up image. Further, the output data production unit 70 may produce not only data of an image but also audio data of effective sound or the like. In the block database 64, a program that defines a process to be performed in response to data or a movement of an image to be rendered at the position of the block in the picked up image and so forth are stored in an associated relationship with an identification number of the block.

In this manner, in the present embodiment, a block placed on the play field 100 is recognized on the basis of a picked up image by the image pickup apparatus 12 and performs corresponding information processing. Upon recognition, color information is significant together with a shape and a size of the block. On the other hand, despite being the same block, a block sometimes changes in color of a picture on a picked up image from various factors such as an illumination environment in a real space or presence or absence or a color of an article existing around the block. Consequently, the block is sometimes recognized as a different block or a plurality of blocks having similar colors create confusion, and as a result, it is considered that information processing is not performed appropriately. Therefore, in the present embodiment, the calibration chart 102 is provided on the play mat 18 such that adjustment or correction of an image pickup condition or obtained image data is performed in order to improve the recognition accuracy of a block.

Figure 4:
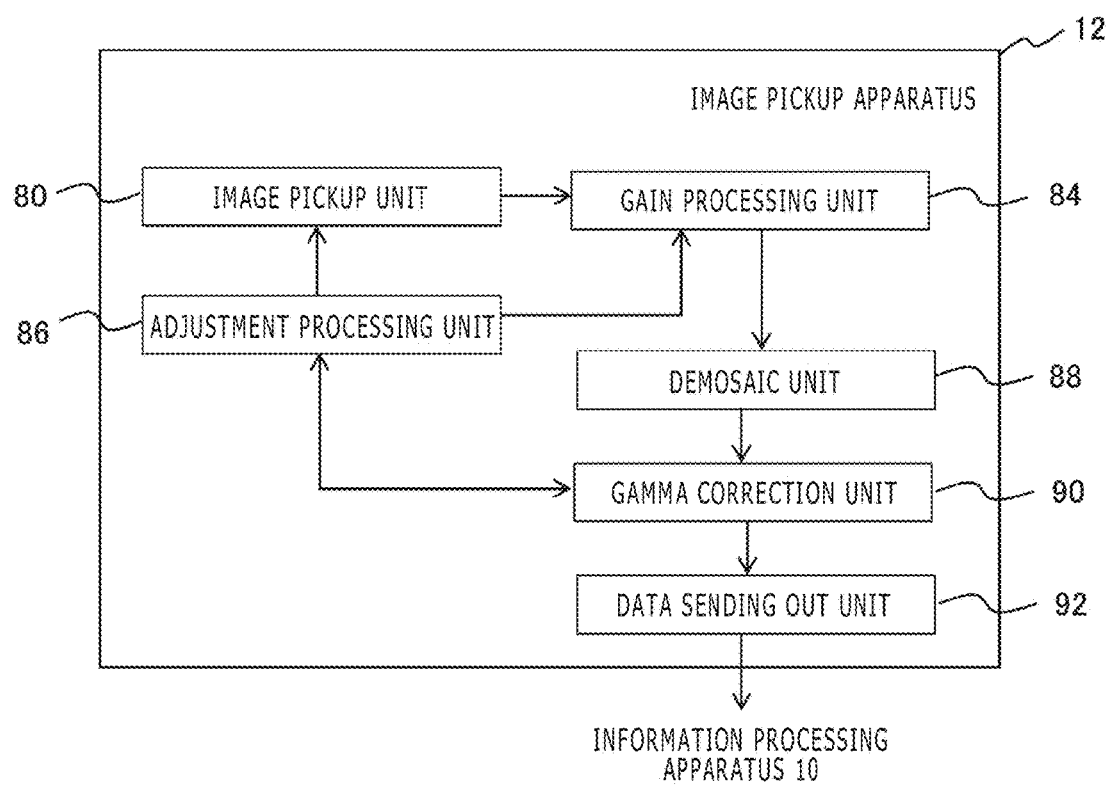
FIG. 4 is a view depicting a configuration of functional blocks of an image pickup apparatus in the present embodiment.

FIG. 4 depicts a configuration of function blocks of the image pickup apparatus 12. The image pickup apparatus 12 includes an image pickup unit 80, a gain processing unit 84, an adjustment processing unit 86, a demosaic unit 88, a gamma correction unit 90 and a data sending out unit 92. It is to be noted that, where the image pickup apparatus 12 is configured as a stereo camera, the function blocks other than the data sending out unit 92 are provided for each of cameras of the stereo camera. The image pickup unit 80 is configured from an image pickup element such as a CCD element or a CMOS element and outputs an exposure result at a predetermined timing (for example, 60 times/second) as pixel values of images. The image outputted here is a RAW image (non-processed image) configured from one of red, green and blue (RGB) colors and is outputted in a predetermined pixel order such as a raster order to the gain processing unit 84.

The gain processing unit 84 is configured from a variable gain amplification circuit or the like, and amplifies a red primary color signal (R value), a green primary color signal (G value) and a blue primary color signal (B value) outputted from the image pickup unit 80 with set gain values and then outputs resulting signals in a raster order or the like to the demosaic unit 88. The adjustment processing unit 86 determines, on the basis of a picture of the calibration chart 102 on the picked up image, at least one of an exposure time period of the image pickup unit 80, a gain value to be set to the gain processing unit 84 and a correction rule for pixel values in the gamma correction unit 90. As hereinafter described, they may be determined on the basis not only of the calibration chart 102 but also of an actual picture of the block. Results of the determination are each notified of to the image pickup unit 80, gain processing unit 84 and gamma correction unit 90.

The demosaic unit 88 acquires data of RAW images whose pixel values are amplified from the gain processing unit 84 and executes a demosaic (de-mosaic) process of complementing color information to the pixels on the basis of their peripheral pixels to create a full color image. To this demosaic process, a well-known technology can be applied. For example, for a pixel having only a G value in the RAW images, RGB values are determined such that, as an R value, an average of R values of pixels neighboring on the left and the right is used; as a G value, the G value of the pixel is used as it is; and as a B value, a B value of a pixel neighboring upwardly or downwardly is used. By performing a similar complementing process for all pixels, an RGB image in which each pixel has RGB values is obtained. The demosaic unit 88 further substitutes the RGB image into a predetermined conversion formula to obtain a YCbCr image.

The gamma correction unit 90 corrects a full color image produced in such a manner as described above with a predetermined correction formula to produce data of an output image. The gamma correction unit 90 is basically configured so as to convert a pixel value in accordance with a well-known gamma curve such that color signals output by the image pickup elements are displayed in an appropriate color balance on a display apparatus. On the other hand, when a block is to be detected, an image corrected in accordance with a curve obtained by deforming a gamma curve is used such that similar colors can be distinguished from each other with a high degree of accuracy.

The gamma correction unit 90 outputs data of a produced output image to the adjustment processing unit 86 and the data sending out unit 92. The data sending out unit 92 transmits the data of the output image to the information processing apparatus 10 by general communication means. The adjustment processing unit 86 acquires, every time various parameters are adjusted in such an order as hereinafter described, an output image after the adjustment from the gamma correction unit 90 and evaluates the output image to perform further adjustment or to determine to end the adjustment.

Figure 5:
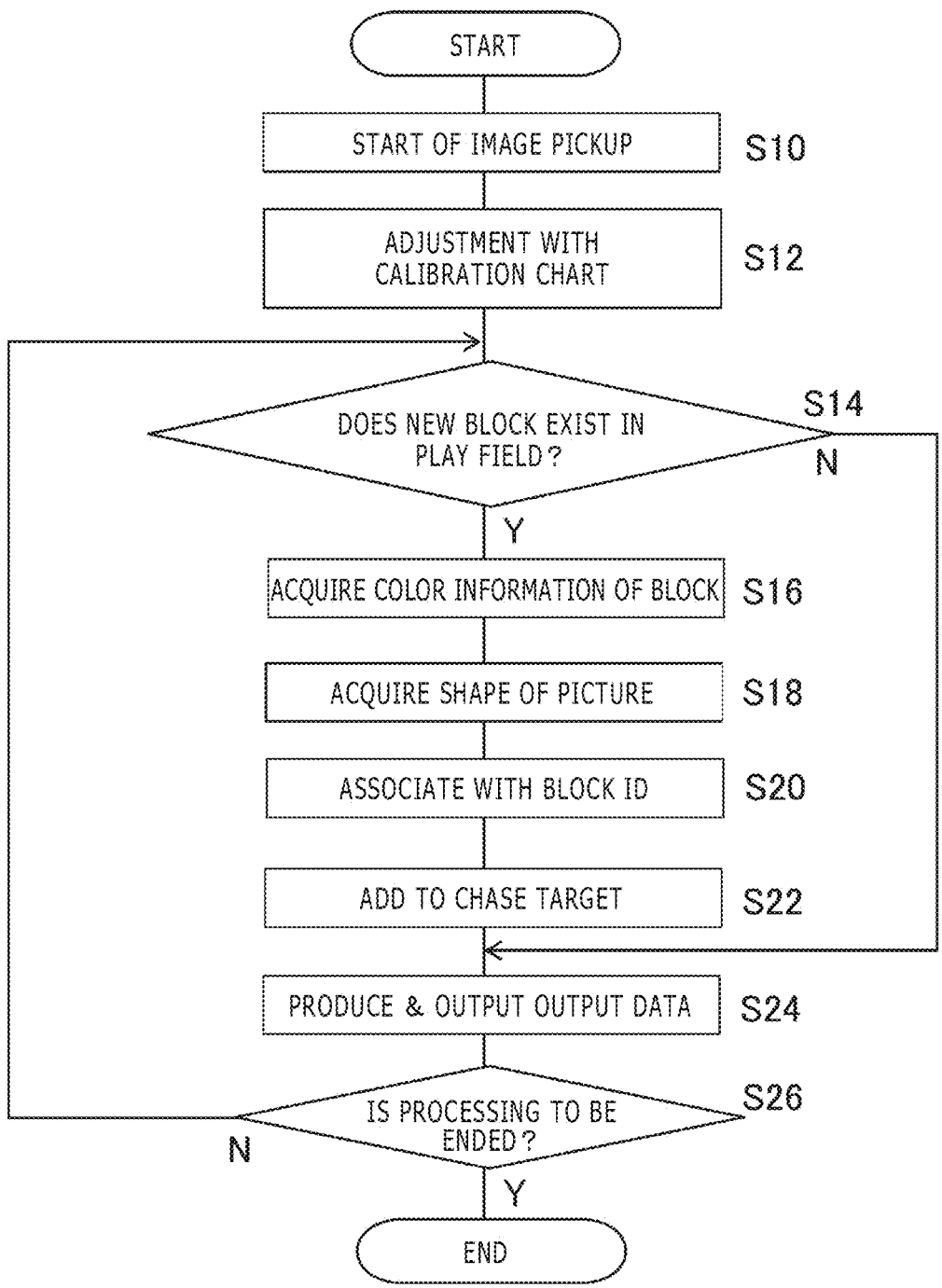
FIG. 5 is a flow chart illustrating a procedure of information processing performed by the image pickup apparatus and the information processing apparatus in the present embodiment and including block recognition.

Now, operation of the information processing system 1 implemented by the configuration described above is described. FIG. 5 is a flow chart illustrating a procedure of information processing including block recognition, which is performed by the image pickup apparatus 12 and the information processing apparatus 10. Operation of this flow chart is started when a user issues a request for starting processing to the information processing apparatus 10 through the inputting apparatus 14. Note that it is assumed that the image pickup apparatus 12 is set by the user such that the entire play mat 18 is included in the field of view.

Further, if the picked up image acquisition unit 54 of the information processing apparatus 10 issues a request to start image pickup to the image pickup apparatus 12, then the image pickup unit 80 of the image pickup apparatus 12 starts image pickup (S10). In this picked up image, the calibration chart 102 is shown. As occasion demands, the field of view of the image pickup apparatus 12 may be optimized such that the calibration chart 102 is shown well. For example, the information processing apparatus 10 instructs the user to manually perform direction adjustment or magnification adjustment through the display apparatus 16 or the like. Alternatively, the information processing apparatus 10 may control the field of view of the image pickup apparatus 12 utilizing a pan-tilter or an electronic zoom not depicted provided in the image pickup apparatus 12.

In the processes described above, the information processing apparatus 10 acquires a picked up image once and detects a region in which a picture of the calibration chart 102 exists in the image. The information processing apparatus 10 may notify the image pickup apparatus 12 of a result of the detection such that the image pickup apparatus 12 recognizes the calibration chart 102. On the basis of the picked up image of the calibration chart 102 obtained in this manner, the adjustment processing unit 86 of the image pickup apparatus 12 adjusts at least one of an exposure time period by the image pickup unit 80, a gain value to be set to the gain processing unit 84 and a correction rule for the gamma correction unit 90 (S12).

By this adjustment, an output image in which, even if an image pickup environment changes, this does not have a significant influence on the color of the picture of the block is obtained. Further, an output image in which a small difference between similar colors is emphasized is obtained. The data sending out unit 92 of the image pickup apparatus 12 outputs data of the output image after the adjustment to the information processing apparatus 10. The detection unit 60 of the information processing apparatus 10 supervises, on the basis of the picked up image transmitted thereto from the image pickup apparatus 12, whether or not a new block enters the space above the play field 100 (S14).

If a new block enters (Y at S14), then the recognition unit 62 acquires color information of the block on the image (S16). Further, the recognition unit 62 specifies a region in which the color continues as a region of the picture of the block and acquires a shape of the region (S18). Then, the recognition unit 62 refers to the block database 64 to specify an identification number assigned to the block and associates the identification number and the picture on the image with each other on basis of the color and the shape of the region (S20). Although the identification number here is assigned upon shipment or the like of the block, this is not limited to a number but may be a name or the like.

It is to be noted that, depending upon targeted information processing, such a mode may be available that, after the user places the block on the play field 100, the block is registered on the spot by selecting, or designating by voice, a name to be applied to the block or an object to be associated with the block from within a list displayed on the display apparatus 16. In this case, for example, characteristics of an appearance such as a color of the block, a name designated by the user and so forth are stored in an associated relationship with each other into the block database 64 such that the registration information may be maintained also at a later timing.

Also in this mode, registration information in the past can be specified accurately by preventing the color of the picture of the block from being changed by an external factor. It is to be noted that, in this case, a program for a process or the like to be performed in response to image data or a movement of an object may be stored in the block database 64 in an associated relationship with a name or the like that can be designated by the user in place of the block. Meanwhile, the detection unit 60 chases the picture of the block detected depending upon Y at S14 and continuously notifies the output data production unit 70 of the position information of the picture (S22).

The output data production unit 70 performs information processing in accordance with the chase result on the basis of the identification number of the block notified of from the recognition unit 62 to produce output data and outputs the output data from the display apparatus 16 or the like (S24). While no block exists in the space above the play field 100 at S14 (N at S14), an initial screen image of a game or the like, the picked up image or the like continues to be displayed (S24). While the user does not request to end the process through the inputting apparatus 14 (N at S26), if a new block enters the space above the play field 100 (Y at S14), then the picture and the identification number of the block are associated with each other and the picture is added as a chase target (S16 to S22).

If a new block does not enter (N at S14), then only the block that has been detected till then continues to be chased and output data is produced and outputted in response to a result of the chase or the like (S24). If the user requests to end the process through the inputting apparatus 14, then all processes including image pickup are ended (Y at S26). It is to be noted that the picked up image used in detection and recognition of a block at S14 to S20 is an image whose various parameters have been adjusted by the adjustment processing unit 86 of the image pickup apparatus 12 in order to recognize the block accurately. On the other hand, in order to chase the picture of the block or produce output data at S24, an image for which at least part of such adjustment has not been performed may be used.

Especially, where a picked up image is processed to produce a display image, it is more natural to use an image of a state proximate to an actual state. Also in the chase process, where a technique in which color information of a block is not significant like a case in which only a contour of a block is chased from a preceding frame is used, a picked up image not adjusted as yet can be used. Therefore, the image pickup apparatus 12 may transmit both of data of an image for which adjustment is performed and another image for which no adjustment is performed to the information processing apparatus 10 as occasion demands.

For example, in a mode in which a new block is detected in parallel to chase of a block or production of an output image, both data are transmitted at the same time and are selectively used in the inside of the information processing apparatus 10. In another mode in which all blocks are recognized as an initial process and a new block does not enter at the stages of chase of a block and production of an output image, an adjusted picked up image is transmitted in an initial process, and changeover is performed such that, upon later operation, a picked up image that is not adjusted as yet is transmitted. At this time, the information processing apparatus 10 notifies the image pickup apparatus 12 of a timing of the changeover.

Further, in the example of FIG. 5, adjustment of various parameters in the image pickup apparatus is performed only at S12 using the calibration chart 102. On the other hand, at least part of parameters may be adjusted in response to a distribution of colors of blocks that have actually entered the space above the play field 100 or of blocks registered by the user as hereinafter described. In this case, every time a new block is detected, color information acquired at S16 is notified of from the information processing apparatus 10 to the image pickup apparatus 12 such that the adjustment processing unit 86 of the image pickup apparatus 12 successively records distribution information of the colors of the blocks and performs adjustment as occasion demands.

Figure 6:
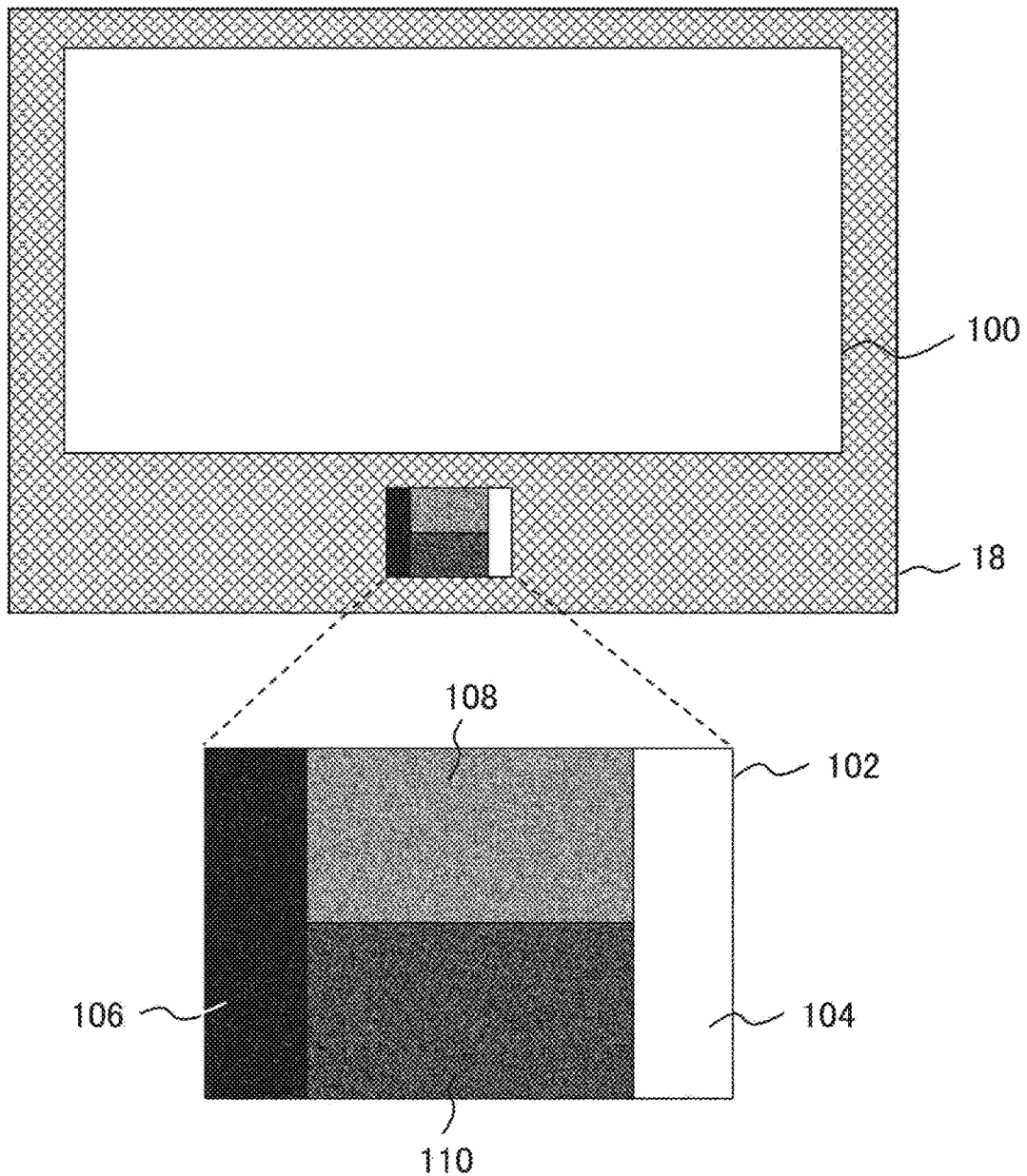
FIG. 6 is a view exemplifying an upper face of a play mat in the present embodiment.

FIG. 6 exemplifies a top plan view of the play mat 18. As described hereinabove, the play mat 18 includes a play field 100 indicating a region in which a user places or moves a block, and a calibration chart 102 for optimizing an image pickup condition or adjustment and correction conditions of the image. The play field 100 preferably is a region filled with a color different from that of a block such that only the picture of the block can be extracted with high accuracy on the image. However, it is not the gist that the present embodiment is limited to this, and a pattern, a sketch or the like may be drawn in the play field 100. Also the shape of the play field 100 is not limited to that depicted in FIG. 6.

The calibration chart 102 is configured from a plurality of achromatic color regions of different luminances as depicted in an enlarged scale on the lower side of the play mat 18 in FIG. 6. In the case of FIG. 6, the calibration chart 102 is configured from four regions of a white region 104, a black region 106, a first grey region 108 and a second grey region 110. However, the disposition or size of the regions is not limited especially. Also the number of grey regions, namely, the number of stages of intermediate luminances is not limited especially. Further, as hereinafter described, a region of a chromatic color may be provided in the calibration chart 102.

The adjustment processing unit 86 extracts, if it acquires data after gamma correction of an image obtained by image pickup of the calibration chart 102 from the gamma correction unit 90, pictures of the white region 104, black region 106 and first grey region 108 (or second grey region 110) and adjusts the exposure time period and the gain value of each of the regions at least with the following policies.
(1) To cause the luminance to have a predetermined target value
(2) To adjust balances of RGB to each other (white balance adjustment)

Further, the adjustment processing unit 86 compares the luminances of at least two regions from among the white region 104, black region 106, first grey region 108 and second grey region 110 and adjusts a gain value and a correction rule upon gamma correction at least with the following policy.
(3) To make it possible to obtain the difference in luminance appropriately.

Figure 7:
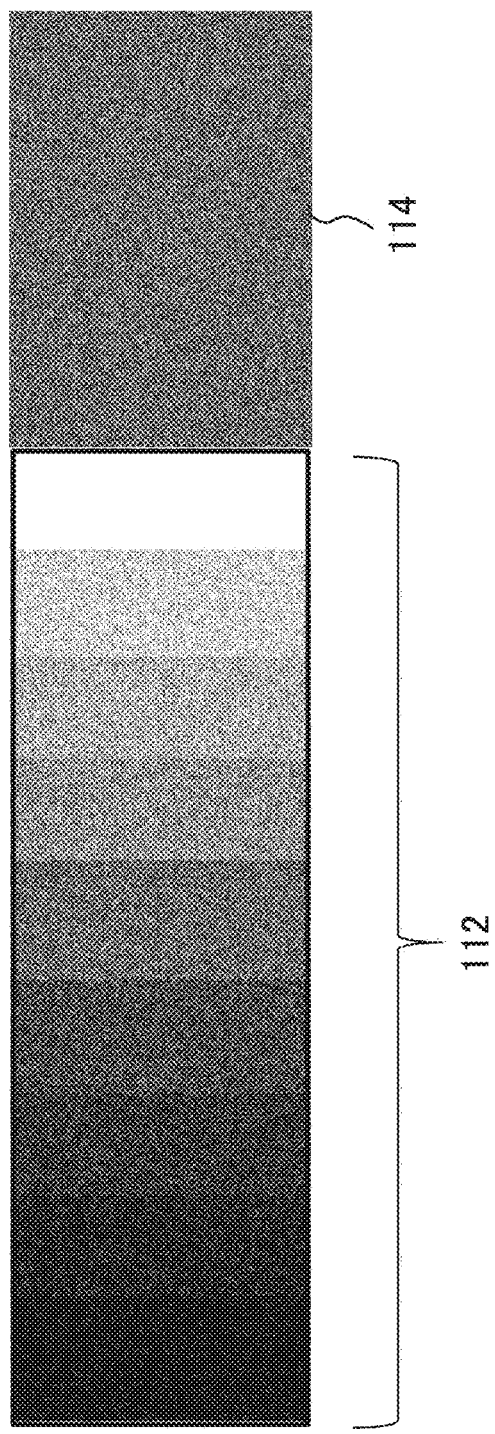
FIG. 7 is a view depicting a modification to a calibration chart in the present embodiment.

FIG. 7 depicts a modification to the calibration chart 102. The calibration chart of the present example is configured from a grey step region 112 configured from nine regions of achromatic colors of different luminances from black to white, and a grey region 114 having a predetermined luminance and having a comparatively great area. The calibration chart 102 is used to determine an area and a stage number optimum to perform adjustment with high accuracy in response to a color distribution of blocks which can be supposed. The policy for adjustment is similar to that described hereinabove.

Figure 8:
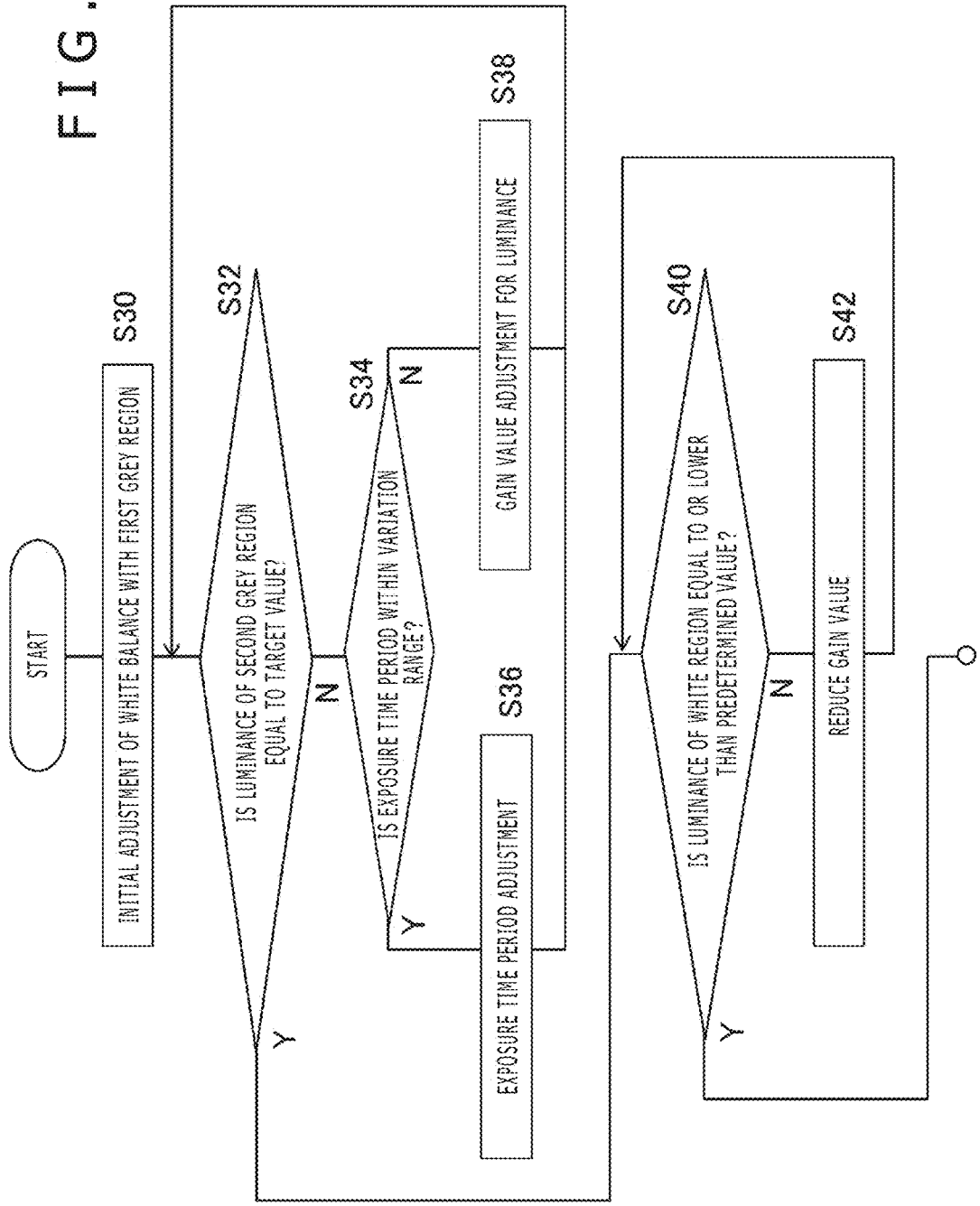
FIG. 8 is a flow chart illustrating a processing procedure of the image pickup apparatus that adjusts an exposure time period, a gain value and a correction rule upon gamma correction at S12 of FIG. 5.
Figure 9:
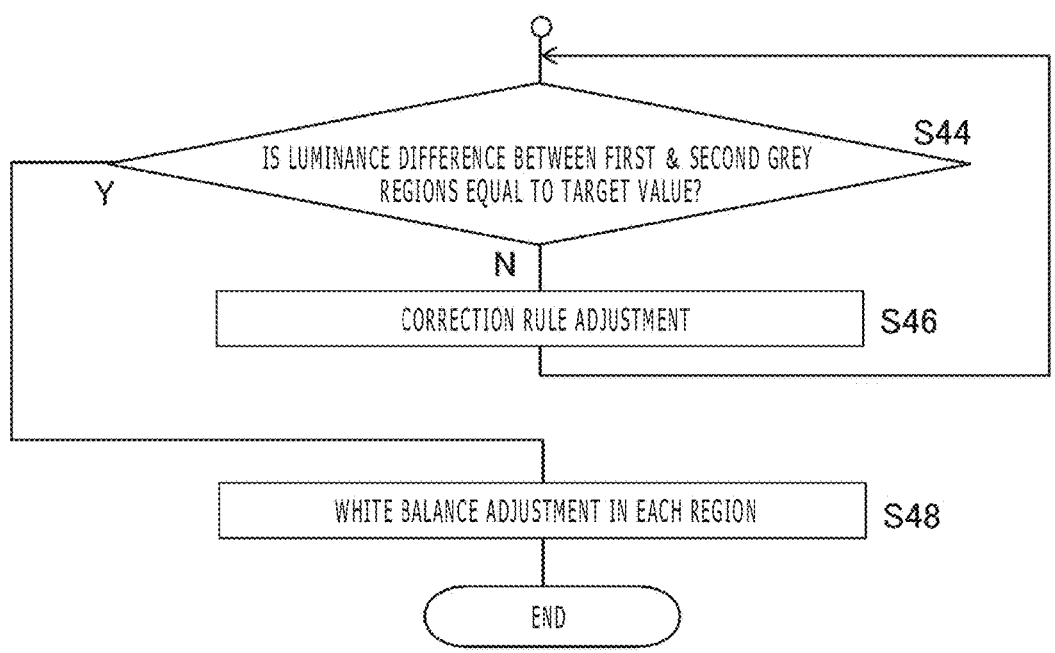
FIG. 9 is a flow chart illustrating a processing procedure of the image pickup apparatus that adjusts an exposure time period, a gain value and a correction rule upon gamma correction at S12 of FIG. 5.

FIGS. 8 and 9 are flow charts illustrating a processing procedure by the image pickup apparatus 12 for adjusting the exposure time period, gain value and correction rule upon gamma correction at S12 of FIG. 5. RAW images acquired by the image pickup unit 80 and including a picture of the calibration chart 102 as described hereinabove become an output image through processes by the gain processing unit 84, demosaic unit 88 and gamma correction unit 90. The gamma correction unit 90 supplies data of the image to the adjustment processing unit 86. Note that it is assumed that, although omitted in the depicted flow charts, the processes are carried out in parallel to each other at a predetermined rate and, as a result, data of a produced image is used for adjustment by the adjustment processing unit 86 at an appropriate timing. Further, some of the illustrated adjustments may be omitted or changed in order.

The adjustment processing unit 86 first performs initial adjustment of the white balance using the first grey region 108 in a picked up image at an initial stage supplied from the gamma correction unit 90 (S30). In particular, average values R_ave, G_ave and B_ave of R values, G values and B values of a picture of the first grey region 108 are each calculated, and gain values Gain_R, Gain_G and Gain_B for the R values, G values and B values are determined in the following manner.

Gain_R=G_ave/R_ave

Gain_G=1

Gain_B=G_ave/B_ave

The gain processing unit 84 multiplies the R values, G values and B values of the RAW images by the gain values by to obtain a picture of an achromatic color in which average luminances of the color components of the first grey region 108 are equal to each other, and as a result, the white balance is adjusted. After the adjustment processing unit 86 sets the determined gain values to the gain processing unit 84, it acquires a picked up image after the adjustment from the gamma correction unit 90 and confirms whether the luminance of the picture of the second grey region 110 from within the picked up image after the adjustment is equal to a target value (S32).

By setting a target value in advance to an intermediate luminance of a grey region and adjusting the exposure time period or the gain value such that the set target value may be obtained, such a situation that a luminance or a color component reaches a maximum gradation and is saturated or the variation range of the gradation decreases is prevented whichever color the block has or even if an image pickup environment changes. It is to be noted that the target value may be a single value or may have some range. In adjustment, the exposure time period is adjusted first, and part that cannot be adjusted with the exposure time period is adjusted with the gain value. This is because, especially where it is necessary to increase the luminance, also noise is amplified as the gain value increases.

In particular, where the luminance of a picture of the second grey region 110 is not equal to the target value (N at S32), if possible, the exposure time period in the image pickup unit 80 is adjusted (Y at S34 and S36). In particular, if the luminance is equal to or higher than the target value, then the exposure time period is shortened, but if the luminance is lower than the target value, then the exposure time period is increased. On the other hand, if the exposure time period reaches the lower limit value or the upper limit value of the variation range and cannot be decreased or increased any more (N at S34), then the gain value to be set to the gain processing unit 84 is adjusted (S38). In other words, if the luminance is higher than the target value, then the gain value is decreased, but if the luminance is lower than the target value, then the gain value is increased. It is to be noted that the variation range of the exposure time period is a range within which an appropriate image is obtained taking the scanning speed, frame rate or the like of pixels into consideration.

Not only where the exposure time period is adjusted but also where the gain value is adjusted, it is confirmed whether the luminance of the second grey region 110 is equal to the target value on the basis of a picked up image obtained after the adjustment by the predetermined variation amount (S32). If the luminance of the second grey region 110 is not equal to the target value, then the exposure time period or the gain value is adjusted again (S34 and S36 or S38). This is repeated until after the luminance of the second grey region becomes equal to the target value, and if the target value is reached (Y at S32), then the picked up image at the setting is acquired and it is confirmed whether the luminance of the picture of the white region 104 in the picked up image is equal to or lower than a predetermined value (S40).

In particular, it is confirmed on an actual image whether the white color is saturated to decide whether or not the adjustment based on the second grey region at S32 to S38 is appropriate. For example, if it is assumed that the luminance is indicated by 256 gradations, then it is confirmed whether the luminance of the white region 104 is equal to or lower than 250. If the luminance is higher than the predetermined value (N at S40), then the gain value of the luminance set by the processes till then is reduced by multiplying the gain value by a coefficient lower than 1 (S42). This process is repeated until after the luminance of the picture of the white region 104 becomes equal to or lower than the predetermined value, and if the luminance becomes equal to or lower than the predetermined value (Y at S40), then adjustment based on the luminance difference between the regions is performed as illustrated in FIG. 9.

It is to be noted that adjustment for setting the luminance of a picture of the black region 106 to a value equal to or higher than a predetermined value in the proximity of the lowest gradation similarly as in the adjustment of setting the luminance of the picture of the white region 104 to a value equal to or lower than the predetermined value at S40 and S42. This prevents such a situation that all blocks of dark colors come to look black as a result of later processing. However, if such a policy is applied that the adjustment process beginning with S32 adjusts the luminance in only one direction such as a direction in which the luminance is gradually increased from a low luminance or in another direction in which the luminance is gradually decreased from a high luminance, then either it is confirmed from the picture of the white region 104 whether the gain value is excessively high or it is confirmed from the picture of the black region 106 whether the gain value is excessively low.

Thereafter, the adjustment processing unit 86 acquires picked up images according to the settings performed till then as depicted in FIG. 9, determines average values in luminance of the pictures of the first grey region 108 and the second grey region 110 and confirms whether the difference between the average values reaches a target value (S44). For example, if it is intended to set the difference in luminance between the first grey region 108 and the second grey region 110 to 10% of the maximum gradation, a difference in luminance of 25 gradations among 256 gradations is required.

The value for which 10% is exemplified here may be a value that reflects a luminance difference between original colors of the first grey region 108 and the second grey region 110 or may be set to a luminance difference which can be obtained on the image even if the original colors do not have such a difference as described above. For example, if it is intended to handle blocks having colors of luminances close to each other at the same time, then confusion of the blocks can be prevented by increasing the difference in luminance between pictures from that between the original colors. If the luminance difference between the pictures of the first grey region 108 and the second grey region 110 does not reach the target value (N at S44), then the correction rule in the gamma correction unit 90 is adjusted such that the luminance difference reaches the target value (S46).

Basically, a corresponding portion of the original gamma curve is deformed. However, actually a different correction formula may be inserted into the portion in place of deforming a line as a graph. Alternatively, a plurality of tables that discretely represent corresponding relationships between the input luminance and the output luminance may be prepared such that they are selectively utilized. Alternatively else, end points of the pertaining portion may be gradually moved such that the portion is interpolated by a linear line or a curved line such that the original gamma curve connects to the portion. The processes at S44 and S46 are repeated until after the luminance difference between the pictures of the first grey region 108 and the second grey region 110 reaches the target value, and if the target value is reached (Y at S44), then the adjustment processing unit 86 acquires the picked up images at the settings performed till then and adjusts the white balance in each of a plurality of regions that configure the calibration chart 102 from within the picked up images (S48).

This process is basically similar to that at S30, and gain values Gain_R, Gain_G and Gain_B for the R values, G values and B values in the regions are determined using the formula given hereinabove. In particular, since a set of gain values are determined for a luminance represented by a picture in each region, a final gain value is set by averaging for each color component. By the adjustment process described above, block recognition having robustness against a variation of an external factor becomes possible.

Figure 10:
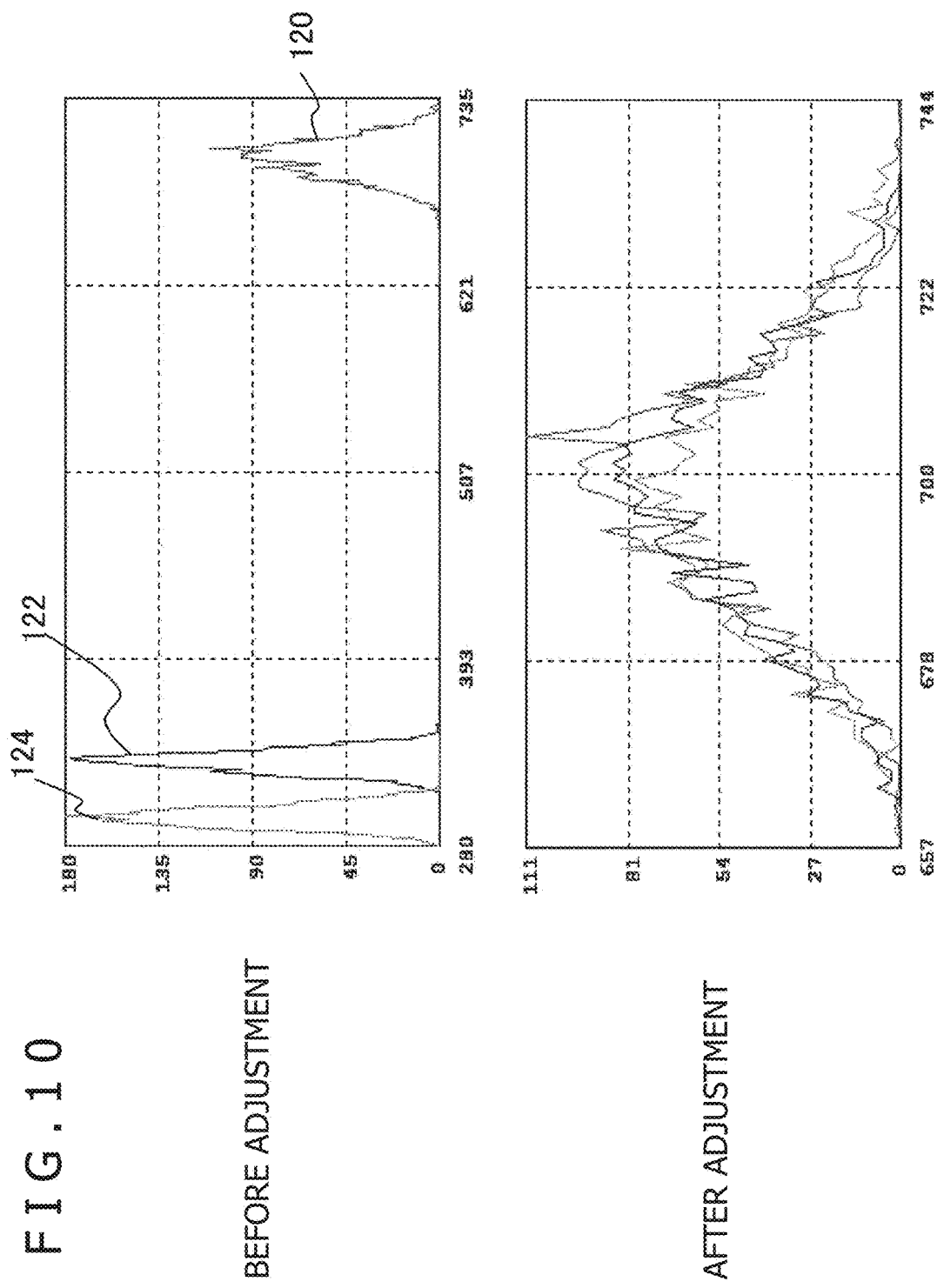
FIG. 10 is a view illustrating white balance adjustment performed in the present embodiment.

FIG. 10 is a view illustrating white balance adjustment performed at S30 of FIG. 8 or S48 of FIG. 9. The upper side in FIG. 10 indicates a color histogram and the lower side in FIG. 10 indicates a color histogram of pictures of the same grey region before adjustment and after adjustment, respectively, and the axis of abscissa indicates the pixel value and the axis of ordinate indicates the pixel number. Before adjustment, a histogram 120 for green components, a histogram 122 for blue components and histogram 124 for red components represent distributions different from each other. Therefore, by multiplying the pixel values by ratios of the average value of G values to the average value of R values and the average value of B values as gains for the R values and the B values, respectively, distributions of R values and B values almost equivalent to the distribution of G values like histograms after adjustment are obtained. However, it is not the gist to limit the adjustment technique for the white balance to this, but any of techniques realized practically may be adopted.

Figure 11:
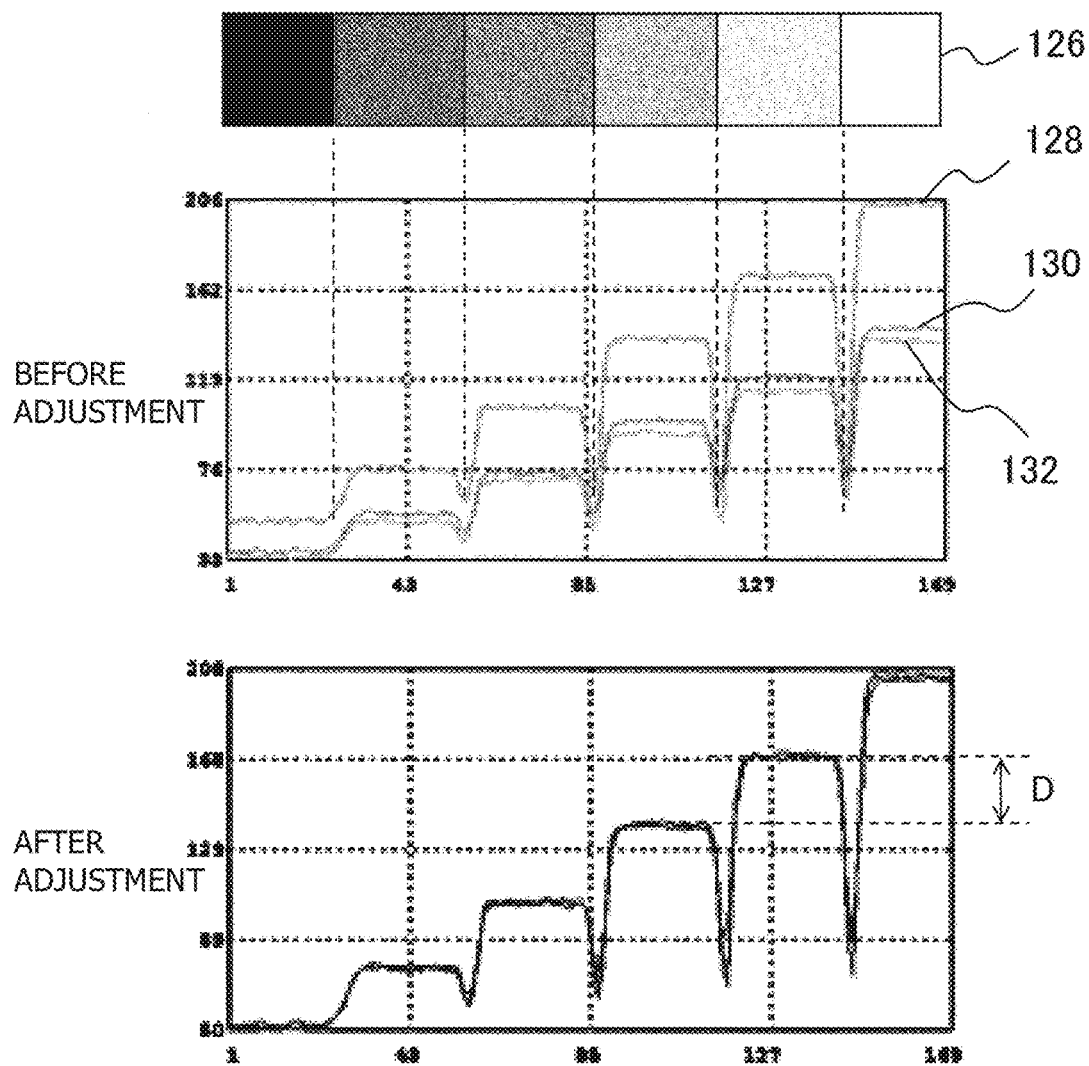
FIG. 11 is a view illustrating a variation of a pixel value when the white balance is adjusted for a plurality of regions configuring the calibration chart in the present embodiment.

FIG. 11 illustrates a variation of a pixel value when the white balance is adjusted for a plurality of regions that configure a calibration chart at S48 of FIG. 9. It is to be noted that the calibration chart in this case is configured such that, as depicted at an upper stage (calibration chart 126) in FIG. 11, six regions in which achromatic colors from black to white are represented by six stages of luminance are juxtaposed in a horizontal direction. The middle stage and the lower stage represent, where the axis of abscissa indicates the position and the axis of ordinate indicates the pixel value, variations of pixel values of color components when such a calibration chart 126 as described above is scanned in a horizontal direction from the black side, and the middle stage indicates the variations before the adjustment and the lower stage indicates the variations after the adjustment.

Before the adjustment, a pixel value 128 of a green component, a pixel value 130 of a blue component and a pixel value 132 of a red component indicate values different from each other in all regions. Therefore, by adjusting the white balance in each region to optimize gain values as described above, it is possible to perform adjustment such that the color components have pixel values substantially equal to each other in all regions as illustrated in the graph after the adjustment. It is to be noted that the luminance difference that is adjusted so as to reach a target value at S44 and S46 of FIG. 9 corresponds, in the case of FIG. 11, to the difference D in pixel value, for example, between two regions.

Figure 12:
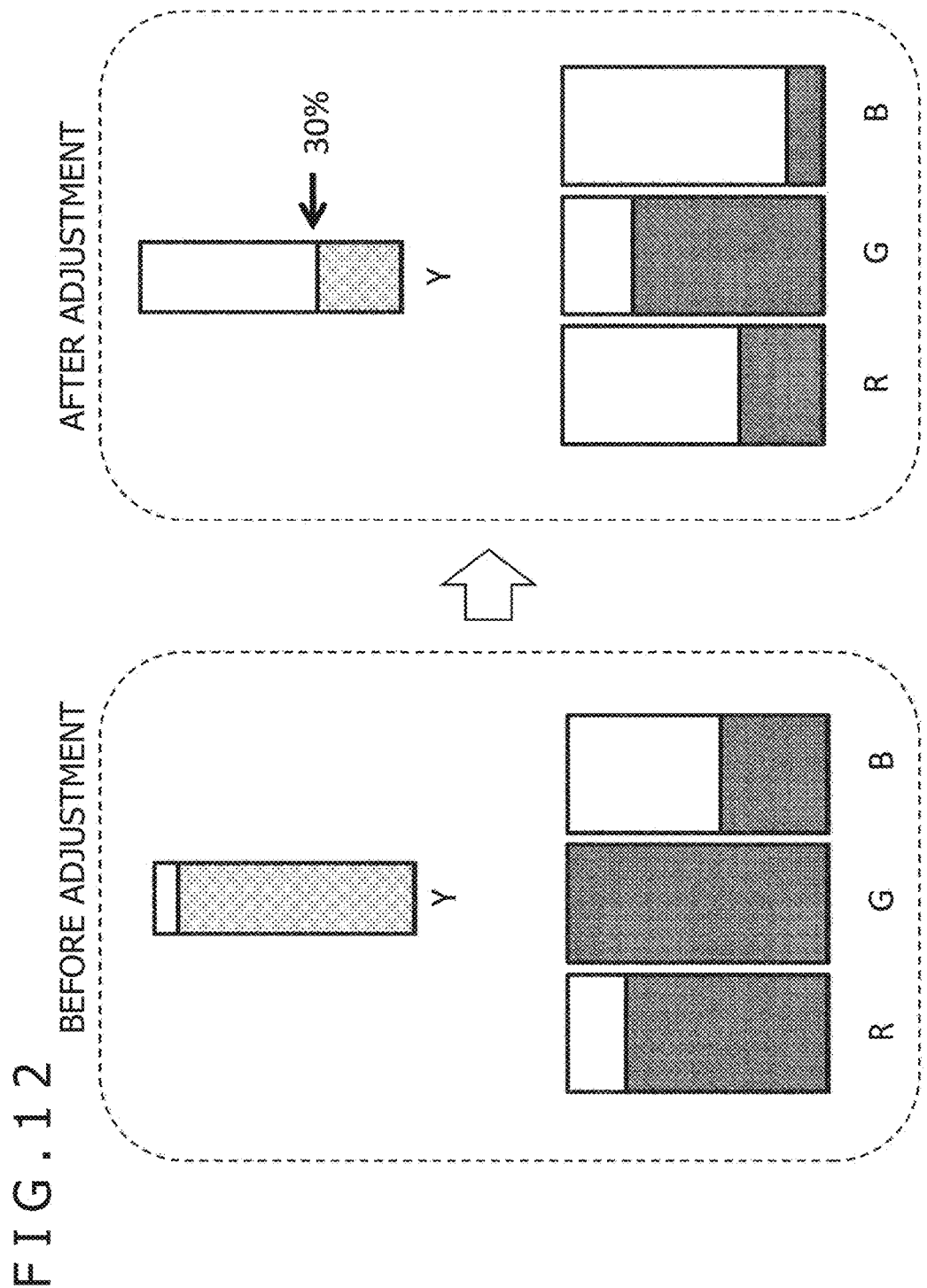
FIG. 12 is a view illustrating a process for adjusting an exposure time period and a gain value at S32 to S38 of FIG. 8.

FIG. 12 is a view illustrating a process for adjusting the exposure time period and the gain value at S32 to S38 of FIG. 8. In the illustration, it is assumed that the demosaic unit 88 generates YCbCr images from RAW images and uses the Y image (luminance image) among the YCbCr images to perform adjustment for adjusting a luminance value of a picture of the grey region to a target value. In this case, the luminance Y of each pixel of RGB images obtained by interpolation of the RAW images is calculated in accordance with the following expression.

$$Y=0.299R+0.587G+0.114B$$

It is assumed that, at S32 of FIG. 8, the luminance of the picture of the second grey region before the adjustment has such a value as indicated by "Y" at an upper stage at the left side in FIG. 12. Here, in a rectangle depicted above "Y," a maximum gradation the luminance value can assume is represented by the top side, and the ratio of the actual average value of the luminance to the maximum gradation is indicated by a dotted region. Further, in FIG. 12, also the ratios of average values of RGB to the maximum gradation are indicated in a similar form at the lower stage. It is to be noted that, since the picture of the second grey region is of an achromatic color, where the white balance is adjusted, the average values of RGB become values substantially equal to each other. Further, in operation, the RGB values vary depending upon the color of a block.

If the exposure time periods or the gain values when such luminance values are obtained are adopted as they are, in regard to a block of a color having a luminance value higher than that of the second grey region, the possibility that the luminance of the picture may be saturated is high. Further, in the case of a color whose specific component such as the G value is higher than the others as depicted in FIG. 12, the specific component becomes liable to be saturated, and as a result, the actual color and the color on the image may become different from each other. Therefore, an appropriate target value is provided for the luminance of the second grey region, and the exposure time period and the gain value are adjusted such that such a picture may be obtained as described hereinabove.

Although a target value is determined strictly depending upon the original luminance of a grey region of an adjustment target, the determination is performed qualitatively such that the luminance and the RGB values may not be saturated in regard to any color. For example, if the target value is set to 60% of the maximum gradation, then when the R value or the B value is zero, the G value becomes higher than 100% from the expression given hereinabove. In other words, the possibility that, even if luminances are similar to each other, saturation may occur with a greenish color is high. If the target value is set to 50%, then where the R value or the B value is 0, the G value is 86%. However, the possibility that the luminance may be saturated with a color having a higher luminance is high. If the target value is set to 30%, then even if the R value or the B value is 0, the G value becomes 57% and a margin of 43% occurs.

For example, if input values of RGB are set to 1024 gradations by 10 bits, then the G value is maximum at the 1024×57%=583rd gradation when the luminance is similar to that of the second grey region. Even where all of the pixel values of RGB are equal to each other, the RGB values can be represented by the 1024×30%=307th gradation. Accordingly, the target value is set to approximately 30% as indicated at the upper side at the right side in FIG. 12, and the exposure time period and the gain value are adjusted with the target value. At this time, the exposure time period is adjusted preferentially as described hereinabove, and if the target value is not reached even if the exposure time period reaches the variation limit, then the gain value of each color component is adjusted.

It is to be noted that to adjust a luminance value as indicated in FIG. 12 is nothing but that RGB images are adjusted at an equal ratio. Accordingly, in some cases, target values may be provided for RGB values such that the exposure time period and so forth are adjusted on the basis of RGB images. In this case, by adjusting the white balance first, target values to be set for the RGG images can be unified to 30% or the like.

Figure 13:
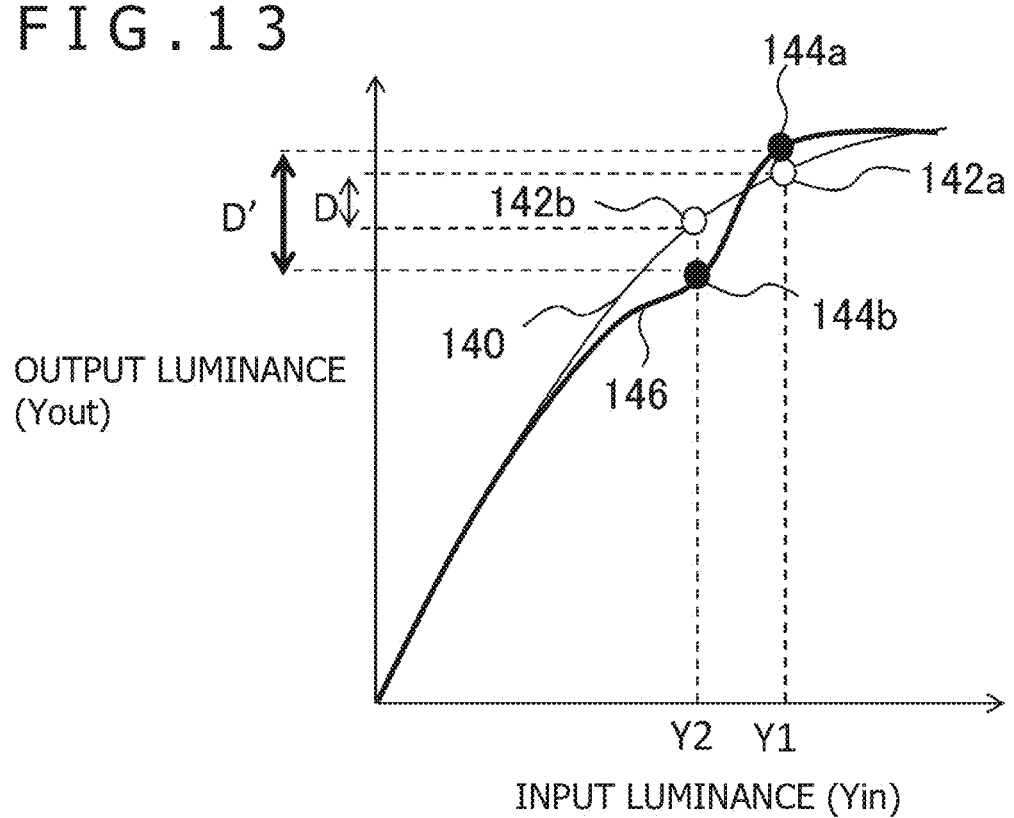
FIG. 13 is a view illustrating a process for adjusting a correction rule in a gamma correction unit at S44 and S46 of FIG. 9.

FIG. 13 is a view illustrating a process for adjusting a correction rule in the gamma correction unit 90 at S44 and S46 of FIG. 9. In a general camera, gamma correction is performed in order to obtain a good color balance on a display unit from output values from image pickup elements. Where a luminance value before correction is an input luminance $Y_{in}$ and a luminance value after correction is an output luminance $Y_{out}$, the gamma correction is executed in accordance with the following expression.

$$Y_{out}=Y_{in}^{(1/\gamma)} \quad \text{[Expression 1]}$$

Here, γ is a value determined on the basis of characteristics and so forth of a supposed display unit. In FIG. 13, the correction expression is indicated by a gamma curve 140 of a thin line where the axis of abscissa indicates the input luminance $Y_{in}$ and the axis of ordinate indicates the output luminance $Y_{out}$. Here, it is assumed that the average values in luminance of the pictures of the first grey region 108 and the second grey region 110 are Y1 and Y2, respectively. If the average values Y1 and Y2 are corrected with the gamma curve 140, then the difference D between the output luminances $Y_{out}$ sometimes becomes comparatively small as indicated by blank circles 142a and 142b. Therefore, the difference D is compared with the target value, and if the difference D does not reach the target value, the gamma curve of the correction rule is deformed to expand the difference between the output luminances $Y_{out}$.

In the example of FIG. 13, a new correction curve 146 (thick line) obtained by deforming a portion of the original gamma curve 140 over which the input luminance changes from Y2 to Y1 and a portion in the proximity of the portion of the original gamma curve 140 is generated to expand the difference D' between the output luminances $Y_{out}$. Actually, the output value at the blank circle 142a corresponding to the input luminance Y1 is increased to that at a black circle 144a, and the output value at the blank circle 142b corresponding to the input luminance Y2 is decreased to that of a black circle 144b. The extent of such increase and decrease may be a fixed value or may be varied in response to the input luminance. Then, the correction curve 146 is obtained by such interpolation by a general technique that the correction curve 146 passes the black circles 144a and 144b and connects to the original gamma curve 140. It is to be noted that the correction curve 146 is not limited to a curved line but may partly or entirely be a linear line.

In either way, by expanding the difference between the output luminances $Y_{out}$ from D to D', distinction in color between blocks having the luminances of the first grey region 108 and the second grey region 110 can be recognized with high accuracy. That distinction in color can be recognized with high accuracy signifies that, even if the luminance of blocks originally having colors same as each other disperses from some external factor, the colors can be regarded as the same color. As a result, block recognition based on a color can be improved in accuracy.

From such a point of view, it is desirable to determine the luminance of the first grey region 108 and the second grey region 110 on the basis of a luminance distribution of colors of blocks used in operation. For example, where it is supposed to use two blocks of different colors having luminances close to each other, if the luminances of the first grey region 108 and the second grey region 110 are adjusted to the luminances of the two colors and then adjustment of the correction curve is performed in such a manner as depicted in FIG. 13, then the difference between the output values of the luminances of the pictures of them can be emphasized.

Where luminances of three or more colors are close to each other, if the variation of the luminance of the grey region is increased in accordance with the luminance values of the blocks like a first grey region, a second grey region, a third grey region, . . . , then the difference in output luminance among pictures of the regions can be emphasized by a similar technique. Although the foregoing technique adjusts a correction curve utilizing a grey region, a correction curve may be adjusted by directly evaluating an actual color distribution of blocks.

Figure 14:
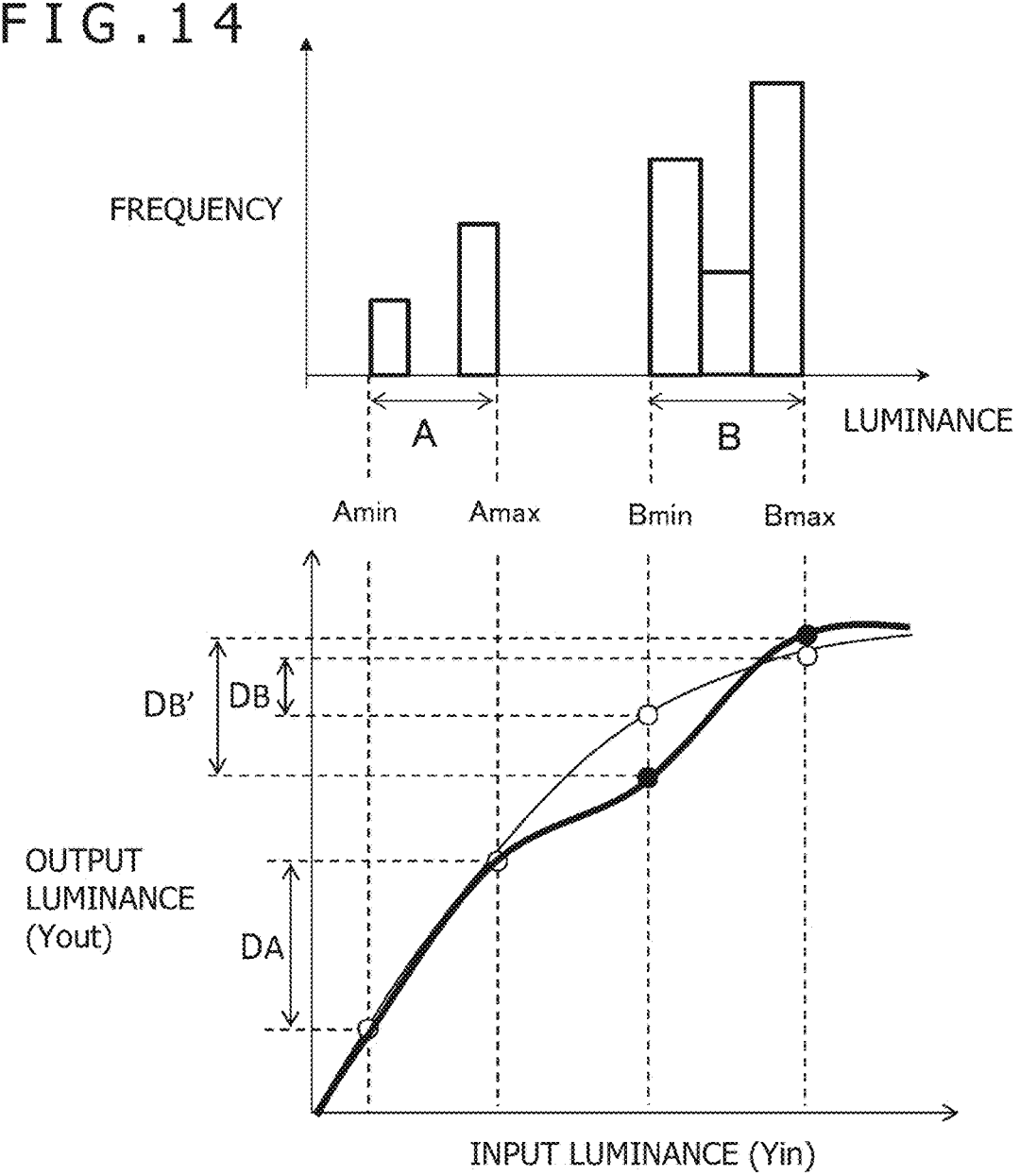
FIG. 14 is a view illustrating a technique for adjusting a correction curve on the basis of a color distribution of blocks in the present embodiment.

FIG. 14 is a view illustrating a technique for adjusting a correction curve on the basis of a color distribution of blocks. The upper stage indicates a histogram that represents, for each luminance of a color of a block, a detection frequency of the block detected when a user places, in operation, the block into the space above the play field 100. In particular, the distribution is updated in response to a situation in operation. As described hereinabove, every time the information processing apparatus 10 detects a block newly, it notifies the image pickup apparatus 12 of color information of the block. The adjustment processing unit 86 of the image pickup apparatus 12 cumulatively records such information to produce and update such a histogram as depicted in FIG. 14. Then, the correction curve is adjusted as occasion demands on the basis of the histogram.

In the example illustrated in FIG. 14, blocks of colors one-sided to a luminance zone A and another luminance zone B are used. Since colors belonging to each luminance zone have similar luminances, the possibility that they may be confused in operation is high. Therefore, a gamma curve is adjusted similarly as in the case illustrated in FIG. 13 such that a sufficient difference may appear between the output luminances. In particular, a difference $D_A$ in output luminance when the lowest luminance Amin and the highest luminance Amax of the luminance zone A are corrected with the gamma curve and a difference $D_B$ in output luminance when the lowest luminance Bmin and the highest luminance Bmax of the luminance zone B are corrected with the gamma curve are confirmed, and if the differences $D_A$ and $D_B$ do not reach the respective target values, then the curve is deformed so as to expand the differences.

Although, in the case of FIG. 14, the difference $D_A$ in output luminance of the luminance zone A reaches the target value, the difference $D_B$ in output luminance of the luminance zone B does not reach the target value, and such a correction curve as indicated by a thick line is produced so as to expand the difference $D_B$ to $D_B'$. Consequently, the possibility that colors belonging to the luminance zone B may be confused is suppressed and all blocks can be recognized with high accuracy. It is to be noted that, since a frequency equal to or higher than 1 is obtained in the luminance zone B at three luminance steps, such adjustment may be performed which increases differences among three points including an intermediate luminance in addition to the lowest luminance Bmin and the highest luminance Bmax. Alternatively, the target value to be provided to the difference in output luminance may be changed in response to the frequency. In the example of FIG. 14, since the frequency of the luminance zone B is high in comparison with the luminance zone A, the target value for the luminance zone B may be set to a higher value.

Similar adjustment can be performed even if the luminance of a grey region of the calibration chart 102 is adjusted to the luminance of the color of a block supposed to be used instead of the user to adjust a correction curve on the basis of a picture of a block actually entered on the play field 100. In particular, such luminance distributions of blocks as depicted in FIG. 14 are acquired in advance, and four grey regions having the lowest luminance Amin and the highest luminance Amax of the luminance zone A and the lowest luminance Bmin and the highest luminance Bmax of the luminance zone B are prepared in the calibration chart 102.

Not only the lowest luminances and the highest luminances but also grey regions of intermediate luminances may be prepared further. Further, if the difference D between the output luminances when the luminance of a picture of a grey region is gamma corrected does not reach a target value as depicted in FIG. 13, then the gamma curve is deformed. In this case, such a mode that a plurality of blocks of different colors and a play mat 18 including a calibration chart 102 configured in accordance with the color distribution of the blocks are provided in a set. It is to be noted that, even if a large number of grey regions between which the step size of the luminance is small and a grey region corresponding to the luminance of the color of a block is selected and used for adjustment, a similar function can be implemented. In this case, the grey region to be used for adjustment is recorded in advance on the basis of colors of blocks detected in the past or colors of blocks to be supplied in a set.

Part of the calibration chart 102 may be configured from a color chart of chromatic colors confirming to colors of blocks. In this case, the variable that is the luminance in FIG. 14 is a three-dimensional or two-dimensional variable such as (R, G, B) or (R/G, B/G). Further, a color region in which colors of blocks are dense in comparison with a predetermined reference density in the color space is detected, and if a standard deviation after correction of the colors or a distance between colors in the color space does not reach a target value, then the gamma curve is deformed so as to expand the standard deviation or the distance.

Figure 15:
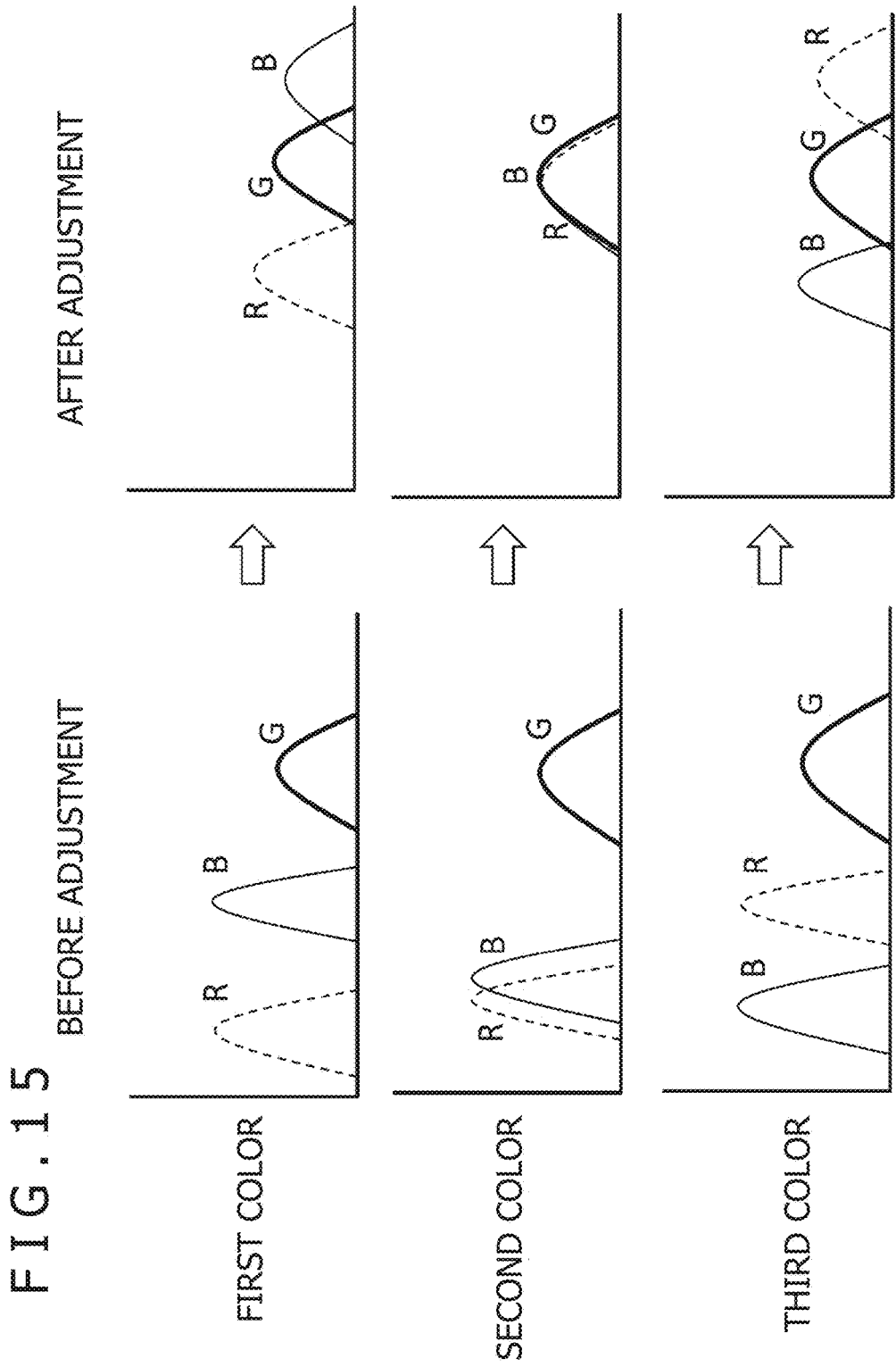
FIG. 15 is a view illustrating a method of adjusting a gain value for RGB utilizing a color chart in the present embodiment.

A difference may be provided between colors before gamma correction by utilizing this color chart to adjust the gain value for each color component by the gain processing unit 84. FIG. 15 is a view illustrating a technique for adjusting the gain values of RGB utilizing the color chart. This process is performed, for example, in the flow chart of FIG. 8, after the processes at S32 to S42 by which the exposure time period or the gain value is adjusted on the basis of a luminance of a picture of a grey region of the calibration chart 102. First, it is assumed that, as the colors of blocks, a first color, a second color and a third color similar to each other are available. The left side in FIG. 15 is a color histogram of each color, which is represented in a form similar to that of FIG. 10.

In this example, it is assumed that a region of a color same as the second color (the region is hereinafter referred to as second color region) is prepared on the calibration chart 102. Then, after the processes at S32 to S42 described hereinabove, the adjustment processing unit 86 extracts a picture of the second color region in a picked up image of the calibration chart 102 and adjusts the white balance with the picture. In other words, the gain values of the color components are determined such that the second color becomes an achromatic color. The manner of adjustment of the white balance is similar to that described hereinabove with reference to FIG. 10. Consequently, distributions of the color components become substantially equal to each other as in a color histogram of the second color at the right side in FIG. 15.

If an image of actual blocks is picked up with the determined gain values, then the histograms of the first color and the third color become such as those depicted at the right side. Although this color information is different from the original colors of the first color, second color and third color, a difference among the first to third colors appears clearly. For example, although, in the original color, the first to third colors are all greenish colors having high G values, after the adjustment, the first color is a strongly bluish color and the second color is close to an achromatic color while the third color is a strongly reddish color.

By preparing a color chart of at least one of colors of blocks to be used and adjusting the white balance with the color in this manner, distinction of the color from similar colors is emphasized in comparison with the original color. As a result, even if color information acquired from a picked up image has some dispersion, confusion with any other color can be avoided. Where a plurality of similar color sets exist like the luminance zones depicted in FIG. 14, a color chart of an average color or the like may be prepared for each color set.

Figure 16:
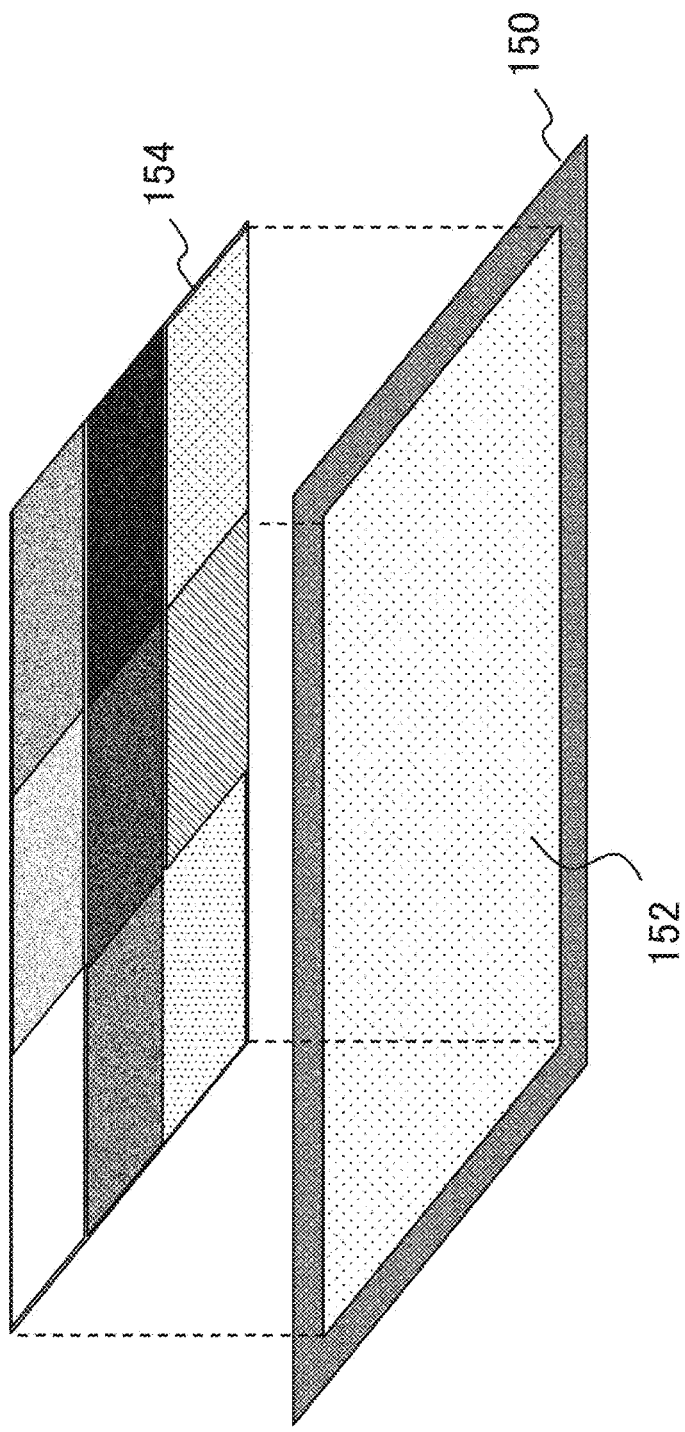
FIG. 16 is a view depicting a modification to the play mat in the present embodiment.

FIG. 16 depicts a modification to the play mat in the present embodiment. A play mat 150 of the present example is configured such that a play field 152 is provided over a substantially overall area and a calibration chart 154 is prepared separately. Further, when an image pickup condition or a correction condition of an image is to be adjusted using the calibration chart 154, the calibration chart 154 is placed on and used together with the play field 152. The calibration chart 154 may be stuck by a hook and loop fastener or the like. On the other hand, in operation where a block is used, the calibration chart 154 is removed to expose the play field 152.

Where the play mat is configured in such a manner as described above, both of the play field 152 and the calibration chart 154 can be configured so as to have an area equal to that of the play mat 150. As a result, a greater number of regions of different luminances or colors can be prepared as the calibration chart 154, and blocks can be handled at a place of a greater area. Further, even if the field of view of the image pickup apparatus 12 is fixed, an image of both of the calibration chart 154 and the play field 152 can be picked up well. In place of configuring the calibration chart 154 so as to be removably mounted in this manner, the play mat may be configured such that a calibration chart is indicated over a substantially overall area of the rear face of the play mat 150. In this case, if the user turns over the play mat as occasion demands, then an effect similar to that described hereinabove can be achieved.

According to the present embodiment described above, in an information processing system including block recognition based on a color, a calibration chart including a plurality of regions of different luminances or colors is provided on a play mat that defines a target space from which a block is to be detected. Then, as an initial process in an image pickup apparatus, at least one of an exposure time period, a gain value to be provided to each color component and a correction rule upon gamma correction is adjusted on the basis of a picture of the calibration chart in a picked up image.

In particular, the exposure time period and the gain value to be provided to each color component are adjusted on the basis of the luminance of a picture of a grey region such that a gradation number can be utilized utmost within a range within which the value of a luminance or a color component is not saturated with any color. Further, the white balance is adjusted on the basis of a region of an achromatic color. Furthermore, a correction curve upon gamma correction is adjusted such that an output luminance difference between regions of different luminances may appear sufficiently.

Further, by providing a region of a color same as that of a block on a calibration chart and adjusting the white balance of the same, a color image in which the difference between the color and a similar color is emphasized is produced. In addition to the calibration chart, a correction curve upon gamma correction may be adjusted in response to a color distribution or a luminance distribution of a block actually entering a space above a play field such that the difference in luminance or color in an output image is emphasized. From those, color information of a block can be acquired from a picked up image in a state in which the influence of a variation of the image pickup environment such as illumination or presence or absence of a different article. Further, confusion between blocks having similar colors can be avoided. As a result, the recognition accuracy of a block based on a color can be improved.

The present invention has been described based on the embodiment. The embodiment described above is exemplary, and it is recognized by those skilled in the art that various modifications are possible in combination of the components or the processes in the embodiment and that also such modifications are included within the scope of the present invention.

REFERENCE SIGNS LIST

1 Information processing system, 20a Block, 10 Information processing apparatus, 12 Image pickup apparatus, 14 Inputting apparatus, 16 Display apparatus, 18 Play mat, 22 CPU, 24 GPU, 26 Main memory, 52 Input information acquisition unit, 54 Picked up image acquisition unit, 60 Detection unit, 62 Recognition unit, 64 Block database, 70 Output data production unit, 72 Image data storage unit, 80 Image pickup unit, 84 Gain processing unit, 86 Adjustment processing unit, 88 Demosaic unit, 90 Gamma correction unit, 92 Data sending out unit, 100 Play field, 102 Calibration chart, 150 Play mat, 152 Play field, 154 Calibration chart.

INDUSTRIAL APPLICABILITY

As described above, the present invention can be utilized in toys, learning equipment, computers, game apparatus, and information processing apparatus, and systems including them.

The invention claimed is:

1. An image pickup apparatus that outputs data of a picked up image to be used for recognition of a real object, comprising:
a computer having a microprocessor coupled to a storage medium containing a computer program, which when executed by the microprocessor, causes the computer to implement the following functional units:
an output image production unit configured to produce data of a picked up image to be outputted from data of a non-processed image picked up using an image pickup element;
an adjustment processing unit configured to evaluate the picked up image and adjust at least one of an image pickup condition in the image pickup element and a processing condition in the output image production unit; and
a data sending out unit configured to output the data of the picked up image to an apparatus that recognizes the real object, wherein
the adjustment processing unit adjusts the image pickup condition and the processing condition based on color information of a picture of a calibration chart that is provided in a space of a recognition target and is configured from a plurality of color regions having luminances different from each other.

2. The image pickup apparatus according to claim 1, wherein the adjustment processing unit evaluates the luminance of a picture of the color regions of the calibration chart and adjusts the processing condition so as to expand the difference between a plurality of luminances corresponding to the luminance of the color of the real object.

3. The image pickup apparatus according to claim 2, wherein the adjustment processing unit determines a luminance range within which the difference is to be expanded based on a luminance distribution of the picture of the real object in the picked up image.

4. The image pickup apparatus according to claim 1, wherein the adjustment processing unit evaluates a color of a picture of a color region having a color same as a color of the real object in the calibration chart and adjusts the processing condition so as to expand a distance between a plurality of colors of different pictures in a color space.

5. The image pickup apparatus according to claim 2, wherein the adjustment processing unit adjusts, as the adjustment of the processing condition, a correction rule upon gamma correction.

6. The image pickup apparatus according to claim 1, wherein the adjustment processing unit adjusts a gain value of each color component such that a picture of a color region in the calibration chart, which has a color same as one of chromatic colors of the real object, has an achromatic color.

7. The image pickup apparatus according to claim 1, wherein the adjustment processing unit evaluates a luminance of a picture of a color region in the calibration chart, which has a given luminance, and adjusts the image pickup condition and the processing condition in a direction in which the luminance is adjusted to a target luminance determined in advance.

8. The image pickup apparatus according to claim 1, wherein the adjustment processing unit adjusts a white balance to a picture of a color region of an achromatic color in the calibration chart.

9. The image pickup apparatus according to claim 1, wherein the data sending out unit parallelly outputs data of a picked up image produced in accordance with a processing condition adjusted by the adjustment processing unit and data of a picked up image produced in accordance with a processing condition that omits at least part of the adjustment by the adjustment processing unit.

10. The image pickup apparatus according to claim 1, wherein the data sending out unit switches and outputs data of a picked up image produced in accordance with a processing condition adjusted by the adjustment processing unit and data of a picked up image produced in accordance with a processing condition that omits at least part of the adjustment by the adjustment processing unit in accordance with a request from an apparatus that recognizes the real object.

11. An information processing system including an image pickup apparatus that outputs data of a picked up image obtained by image pickup of a real object and an information processing apparatus that recognizes the real object using the picked up image, wherein
the image pickup apparatus includes a computer having a microprocessor coupled to a storage medium containing a computer program, which when executed by the microprocessor, causes the computer to implement the following functional units:
an output image production unit configured to produce data of a picked up image to be outputted from data of a non-processed image picked up using an image pickup element,
an adjustment processing unit configured to evaluate the picked up image and adjust at least one of an image pickup condition in the image pickup element and a processing condition in the output image production unit, and
a data sending out unit configured to output the data of the picked up image to the information processing apparatus, and
the adjustment processing unit adjusts the image pickup condition and the processing condition based on color information of a picture of a calibration chart that is provided in a space of a recognition target and is configured from a plurality of color regions having luminances different from each other, and
the information processing apparatus
recognizes a block by comparison between color information of the picture of the real object in the picked up image and color information of real objects registered already with each other and performs a process set for the block.

12. The image pickup apparatus according to claim 1, further comprising a mat that is placed in an image pickup space, wherein:
the mat includes a play field that defines a bottom region of the space in which, when the real object is placed into the space, the real object is determined as the recognition target; and
the mat includes the calibration chart.

13. The image pickup apparatus according to claim 12, wherein the calibration chart includes a color region having a luminance corresponding to a supposed color of the real object of the recognition target.

14. The image pickup apparatus according to claim 12, wherein
the mat includes a first mat that includes the play field and a second mat that includes the calibration chart, and
the second mat is placed and removably mounted on the first mat.

15. An image production method, by an image pickup apparatus, of producing data of a picked up image to be used for recognition of a real object, comprising:
producing data of a picked up image to be outputted from data of a non-processed image picked up using an image pickup element;
evaluating the picked up image and adjusting at least one of an image pickup condition in the image pickup element and a processing condition in the producing; and
outputting the data of the picked up image to an apparatus that recognizes the real object, wherein
the adjusting adjusts the image pickup condition and the processing condition based on color information of a picture of a calibration chart that is provided in a space of a recognition target and is configured from a plurality of color regions having luminances different from each other.

16. A non-transitory, computer readable storage medium containing a computer program, which when executed by a computer, causes the computer to carry out actions to implement a function for producing data of a picked up image to be used for recognition of a real object, the computer program causing the computer to carry out the actions of:
producing data of a picked up image to be outputted from data of a non-processed image picked up using an image pickup element;
evaluating the picked up image and adjusting at least one of an image pickup condition in the image pickup element and a processing condition in the production function; and
outputting the data of the picked up image to an apparatus that recognizes the real object, wherein
the adjusting adjusts the image pickup condition and the processing condition based on color information of a picture of a calibration chart that is provided in a space of a recognition target and is configured from a plurality of color regions having luminances different from each other.

* * * * *